United States Patent
Zheng et al.

(10) Patent No.: US 10,442,709 B2
(45) Date of Patent: Oct. 15, 2019

(54) SELECTIVELY PERMEABLE GRAPHENE OXIDE MEMBRANE

(71) Applicant: NITTO DENKO CORPORATION, Osaka (JP)

(72) Inventors: Shijun Zheng, San Diego, CA (US); Isamu Kitahara, San Diego, CA (US); Makoto Kobuke, Osaka (JP); Peng Wang, San Diego, CA (US); Craig Roger Bartels, San Diego, CA (US); Yuji Yamashiro, Shiga (JP); Masahiko Hirose, Shiga (JP); Shunsuke Noumi, Shiga (JP); Weiping Lin, Carlsbad, CA (US)

(73) Assignee: NITTO DENKO CORPORATION, Osaka (JP)

( * ) Notice: Subject to any disclaimer, the term of this patent is extended or adjusted under 35 U.S.C. 154(b) by 55 days.

(21) Appl. No.: 15/380,797

(22) Filed: Dec. 15, 2016

(65) Prior Publication Data
US 2017/0174537 A1    Jun. 22, 2017

Related U.S. Application Data

(60) Provisional application No. 62/339,589, filed on May 20, 2016, provisional application No. 62/268,835, filed on Dec. 17, 2015.

(51) Int. Cl.
*B01D 63/00* (2006.01)
*C02F 1/44* (2006.01)
(Continued)

(52) U.S. Cl.
CPC ............ *C02F 1/44* (2013.01); *B01D 67/0006* (2013.01); *B01D 67/0044* (2013.01);
(Continued)

(58) Field of Classification Search
None
See application file for complete search history.

(56) References Cited

U.S. PATENT DOCUMENTS

| | | | |
|---|---|---|---|
| 3,457,171 | A | 7/1969 | Berg et al. |
| 2012/0048804 | A1 | 3/2012 | Stetson et al. |

(Continued)

FOREIGN PATENT DOCUMENTS

| | | |
|---|---|---|
| CN | 103768960 A | 5/2014 |
| KR | 10-20120065694 A | 6/2012 |

(Continued)

OTHER PUBLICATIONS

Bano, S.et al., "Graphene oxide modified polyamide nanofiltration membrane with improved flux and antifouling properties", 3(5) J. Mater. Chem. A 2065-2071 (2015).

(Continued)

*Primary Examiner* — Hayden Brewster
(74) *Attorney, Agent, or Firm* — Maschoff Brennan; Brent A. Johnson; David Old

(57) ABSTRACT

Described herein is a graphene material based membrane that provides selective resistance for solutes or gas while providing water permeability. A selectively permeable membrane comprising graphene oxide, reduced graphene oxide, and also functionalized or crosslinked between the graphene, that provides enhanced salt separation from water or gas permeability resistance, methods for making such membranes, and methods of using the membranes for dehydrating or removing solutes from water are also described.

12 Claims, 8 Drawing Sheets

(51) Int. Cl.
| | |
|---|---|
| *B01D 67/00* | (2006.01) |
| *B01D 69/08* | (2006.01) |
| *B01D 69/12* | (2006.01) |
| *B01D 71/02* | (2006.01) |
| *B01D 69/14* | (2006.01) |
| *B01D 61/02* | (2006.01) |
| *B01D 63/02* | (2006.01) |
| *B01D 71/56* | (2006.01) |

(52) U.S. Cl.
CPC ..... *B01D 67/0079* (2013.01); *B01D 67/0083* (2013.01); *B01D 69/08* (2013.01); *B01D 69/12* (2013.01); *B01D 69/125* (2013.01); *B01D 69/148* (2013.01); *B01D 71/024* (2013.01); *B01D 61/025* (2013.01); *B01D 63/02* (2013.01); *B01D 71/56* (2013.01); *B01D 2323/30* (2013.01)

(56) References Cited

U.S. PATENT DOCUMENTS

| | | | |
|---|---|---|---|
| 2013/0284665 A1 | 10/2013 | Lee et al. | |
| 2014/0370246 A1 | 12/2014 | Hurt | |
| 2015/0122727 A1* | 5/2015 | Karnik | B01D 53/22 210/500.21 |
| 2015/0122800 A1 | 5/2015 | Gallastegui et al. | |
| 2015/0231577 A1 | 8/2015 | Nair et al. | |
| 2015/0258506 A1 | 9/2015 | Mi et al. | |
| 2015/0280217 A1 | 10/2015 | Gong et al. | |
| 2015/0344666 A1 | 12/2015 | Macosko | |
| 2016/0038885 A1* | 2/2016 | Hogen-Esch | B01D 69/148 210/321.6 |
| 2018/0147545 A1* | 5/2018 | Prince | B01D 69/02 |
| 2018/0170002 A1* | 6/2018 | Park | B01D 69/10 |
| 2018/0170003 A1* | 6/2018 | Livingston | B32B 27/28 |

FOREIGN PATENT DOCUMENTS

| | | |
|---|---|---|
| WO | 2011/066332 A1 | 3/2011 |
| WO | 2012/102678 A1 | 2/2012 |
| WO | 2012/047359 A1 | 4/2012 |
| WO | 2014/168629 A1 | 10/2014 |
| WO | 2015/075451 A1 | 5/2015 |
| WO | 2015/142938 A1 | 9/2015 |

OTHER PUBLICATIONS

Choi, W. et al., "Layer-by-Layer Assembly of Graphene Oxide Nanosheets on Polyamide Membranes for Durable Reverse-Osmosis Applications", 5 (23) ACS Appl. Mater. Interfaces 12510-12519 (2013).

Gao, Y. et al., "Membrane surface modification with TiO2-graphene oxide for enhanced photocatalytic performance", 455 J. Membrane Sci. 349-356 (Apr. 1, 2014).

Han, G. et al., "Thin film composite forward osmosis membranes based on polydopamine modified polysulfone substrates with enhancements in both water flux and salt rejection", 80 Chemical Engineering Science 219-231 (2012).

Kochkodan, V. et al., "Fabrication of Low-Fouling Composite Membranes for Water Treatment", Membrane Fabrication, 616-653 (CRC Press) (2015).

Hu, M. et al., "Enabling Graphene Oxide Nanosheets as Water Separation Membranes", 47(8) Env. Sci. Tech. 3715-3723 (2013).

Hu, M. et al.,"Layer-by-layer assembly of graphene oxide membranes via electrostatic interaction", 469 J. Membrane Sci. 80-87 (Nov. 1, 2014).

Joshi, R.K. et al., "Precise and Ultrafast Molecular Sieving Through Graphene Oxide Membranes", 343(6172) Science 752-754 (Feb. 14, 2014).

Liu, X. et al., "Layer-by-Layer Self-Assembled Graphene Multilayer Films via Covalent Bonds for Supercapacitor Electrodes", 5(14) Nanomater Nanotechnol 1-7 (2015).

Park, B. at al., "Highly Tunable Interfacial Adhesion of Glass Fiber by Hybrid Multilayers of Graphene Oxide and Aramid Nanofiber", 7 ACS Appl. Mater. Interfaces 3329-3334 (2015).

Tarboush, B., "Preparation of This-Film Polyamide Membranes for Desalination Using Novel Hydrophillic Surface Modifying Molecules", (2008) (M.S. Thesis University of Ottawa), available at https://www.ruor.uottawa.ca/bitstream/10393/28119/1/MR52342.PDF.

Hung, Wei-Song et al., "Cross-Linking with Diamine Monomers To Prepare Composite Graphene Oxide-Framework Membranes with Varying d-Spacing", 26 (9) Chem. Mater. 2983-2990 (2014).

International Search Report and Written Opinion of PCT/US2015/066992, dated Mar. 24, 2017.

Worsley, M.A., et al., "High Surface Area, sp2-Cross Linked Three-Dimensional Graphene Monoliths", The Journal of Physical Chemistry Letters, (2011), 2, 921-925.

* cited by examiner

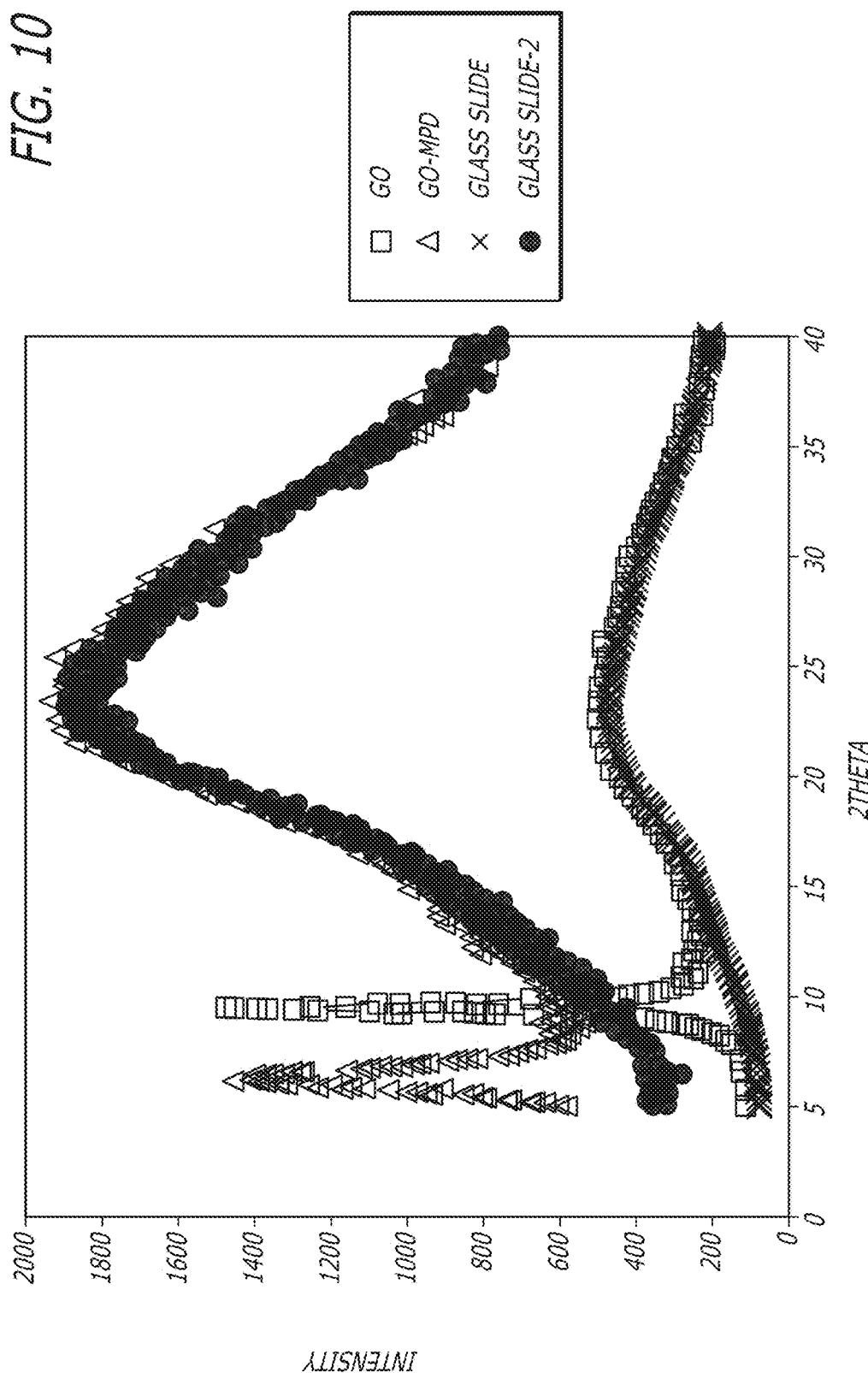

SELECTIVELY PERMEABLE GRAPHENE OXIDE MEMBRANE

CROSS REFERENCE TO RELATED APPLICATION

This application claims the benefit of U.S. Provisional Application 62/268,835 filed Dec. 17, 2015, and U.S. Provisional Application 62/339,589 filed May 20, 2016, which are incorporated by reference for their entirety.

FIELD

The present embodiments are related to polymeric membranes, including membranes comprising graphene materials for uses such as water treatment, desalination of saline water, or water removal.

BACKGROUND

Due to the increase of human population and water consumption coupled with limited freshwater resources on earth, technologies such as seawater desalination and water treatment/recycle to provide safe and fresh water have become more important to our society. The desalination process using reverse osmosis (RO) membrane is the leading technology for producing fresh water from saline water. Most of current commercial RO membranes adopt a thin-film composite (TFC) configuration consisting of a thin aromatic polyamide selective layer on top of a microporous substrate; typically a polysulfone membrane on non-woven polyester. Although these RO membranes can provide excellent salt rejection rate, higher water flux; thinner and more hydrophilic membranes are still desired to further improve energy efficiency of RO. Therefore, new membrane materials and synthetic methods are in high demand to achieve the desired properties as described above.

SUMMARY

This disclosure relates to a GO membrane composition suitable for high water flux applications. The GO membrane composition may be prepared by using a water soluble cross-linker. The water soluble cross-linker may be one that is compatible with the polyamide coating of a reverse osmosis membrane. Methods of efficiently and economically making these GO membrane compositions are also described. Water can be used as a solvent in preparing these GO membrane compositions, which makes the membrane preparation process more environmentally friendly and more cost effective. For the purposes of this disclosure, the term "cross-linker" is interchangeable with the term "crosslinker".

Some embodiments include a selectively permeable polymeric membrane, such as a membrane comprising the high water flux GO membrane composition, for water treatment and desalination of saline water. Some embodiments include a GO-MPD (meta-phenylenediamine) membrane comprising a porous substrate, and a graphene oxide layer comprising an optionally substituted cross-linked graphene oxide in fluid communication with the porous substrate, wherein the optionally substituted cross-linked graphene oxide comprises an optionally substituted graphene oxide and a cross-linkage represented by Formula I or Formula 1M:

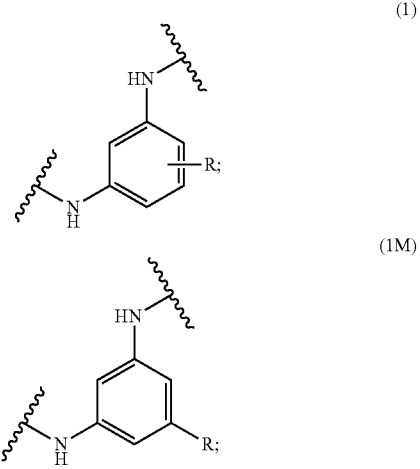

wherein R is H, or an organic acid group or a salt thereof, such as $CO_2H$, $CO_2Li$, $CO_2Na$, or $CO_2K$. In some embodiments, the resulting membrane containing GO-MPD composite as described herein further comprises a salt rejection layer, and/or a protection layer. For the purposes of this disclosure, the term "cross-linked" is interchangeable with the term "crosslinked", and the term "cross-linkage is interchangeable with the term "crosslinkage".

Some embodiments include a method of dehydrating an unprocessed fluid comprising exposing the unprocessed fluid to the above described membranes, or removing a solute, such as desalination, from an unprocessed solution comprising exposing or passing the unprocessed solution to the aforementioned membranes. In some embodiments, passing the unprocessed solution through the membrane is achieved by applying a pressure gradient across the membrane.

Some embodiments include a method of making a membrane, such as dehydration membrane or desalination membrane, comprising mixing an optionally substituted graphene oxide (GO) and a cross-linker, such as an optionally substituted meta-phenylenediamine to get an aqueous solution, followed by resting to get a coating mixture and applying the coating mixture to a substrate, and curing the GO and the cross-linker on the substrate until they are covalently bonded. Some embodiments include separately applying the optionally substituted GO aqueous solution and an optionally substituted meta-phenylenediamine cross-linker aqueous solution to a substrate followed by the same process and conditions of curing until they are covalently bonded. In some embodiments, the method further comprising applying a salt rejection layer, and/or a protection layer.

BRIEF DESCRIPTION OF THE DRAWINGS

FIG. 10 is a plot of XRD data for GO and GO-MPD each on a glass slide with control plots for each glass slide.

DETAILED DESCRIPTION

Figure 1:
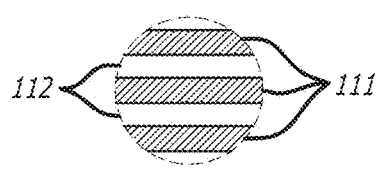
FIG. 1 is a diagram showing the graphene oxide layers of a GO-MPD membrane.

I. General:

A selectively permeable membrane includes a membrane that is relatively permeable for one material and relatively impermeable for another material. For example, a membrane may be relatively permeable to water or water vapor and relatively impermeable to organic liquids or oxygen or nitrogen gas.

As used herein the term "rest," "resting," or "rested" includes the act of leaving a solution stand undisturbed at room temperature and atmospheric pressure for a specific duration of time.

Unless otherwise indicated, when a compound or a chemical structure, such as graphene oxide or phenylenediamine is referred to as being "optionally substituted," it includes a compound or a chemical structure that either has no substituents (i.e., unsubstituted), or has one or more substituents (i.e., substituted). The term "substituent" has the broadest meaning known in the art, and includes a moiety that replaces one or more hydrogen atoms attached to a parent compound or structure. In some embodiments, a substituent may be any type of group that may be present on a structure of an organic compound, which may have a molecular weight (e.g., the sum of the atomic masses of the atoms of the substituent) of 15-50 g/mol, 15-100 g/mol, 15-150 g/mol, 15-200 g/mol, 15-300 g/mol, or 15-500 g/mol. In some embodiments, a substituent comprises, or consists of: 0-30, 0-20, 0-10, or 0-5 carbon atoms; and 0-30, 0-20, 0-10, or 0-5 heteroatoms, wherein each heteroatom may independently be: N, O, S, Si, F, Cl, Br, or I; provided that the substituent includes one C, N, O, S, Si, F, Cl, Br, or I atom. Examples of substituents include, but are not limited to, alkyl, alkenyl, alkynyl, heteroalkyl, heteroalkenyl, heteroalkynyl, aryl, heteroaryl, hydroxy, alkoxy, aryloxy, acyl, acyloxy, alkylcarboxylate, thiol, alkylthio, cyano, halo, thiocarbonyl, O-carbamyl, N-carbamyl, O-thiocarbamyl, N-thiocarbamyl, C-amido, N-amido, S-sulfonamido, N-sulfonamido, isocyanato, thiocyanato, isothiocyanato, nitro, silyl, sulfenyl, sulfinyl, sulfonyl, haloalkyl, haloalkoxyl, trihalomethanesulfonyl, trihalomethanesulfonamido, amino, etc.

For convenience, the term "molecular weight" is used with respect to a moiety or part of a molecule to indicate the sum of the atomic masses of the atoms in the moiety or part of a molecule, even though it may not be a complete molecule.

As used herein the term "fluid" includes any substance that continually deforms, or flows, under an applied shear stress. Such non-limiting examples of fluids include Newtonian and/or non-Newtonian fluids. In some embodiments, examples of Newtonian can be gases, liquids, and/or plasmas. In some embodiments, non-Newtonian fluids can be plastic solids (e.g., corn starch aqueous solution, toothpaste).

As used herein, the term "fluid communication" means that a fluid can pass through a first component and travel to and through a second component or more components regardless of whether they are in physical communication or the order of arrangement.

II. Membrane:

The present disclosure relates to water separation membranes where a highly hydrophilic membrane with low organic compound permeability and high mechanical and chemical stability may be useful to support the polyamide salt rejection layer in a reverse osmosis (RO) membrane. This membrane material may be suitable for solute removal from an unprocessed fluid, such as desalination from saline water, or purifying drinking water, such as waste water treatment. This membrane material may be suitable in the dehydration or water/water vapor removal from an unprocessed fluid. Some selective water permeable membranes described herein are GO-MPD membranes having a high water flux, which may improve the energy efficiency of RO membranes and improve water recovery/separation efficiency. The water permeable GO-MPD membrane comprises an optionally substituted graphene oxide (GO) cross-linked with an optionally substituted arylenediamine, such as an optionally substituted water soluble meta-phenylenediamine (MPD). Thus, using the hydrophilic GO material and the water soluble cross-linkers such as MPD may provide the membranes with broad applications where high water permeability with high selectivity of permeability is important. These GO-MPD membranes may also be prepared using water as a solvent, which can make the manufacturing process much more environmentally friendly and cost effective.

In some embodiments, the selectively permeable membrane further comprises a porous substrate or support, such as a porous support comprising a polymer or hollow fibers. For some membranes, the GO-MPD layer or membrane is disposed on the porous support. The GO-MPD layer or membrane may further be in fluid communication with the substrate. Additional optional layers may also be included such as a salt rejection layer disposed on the GO-MPD layer, a protective layer, and etc. In some embodiments, the protective layer can comprise a hydrophilic polymer. In some embodiments, the fluid passing through the membrane travels through all the components regardless of whether they are in physical communication or the order of arrangement.

A substrate may be any suitable material and in any suitable form upon which a layer, such as a layers of a GO-MBD membrane, may be deposited or disposed. In some embodiments, the substrate may comprise a porous material, such as a polymer or a hollow fiber. In some embodiments, the polymer may be polyethylene (PE), polypropylene (PP), polysulfone (PSF), polyether sulfone (PES), polyvinylidene fluoride (PVDF), polyamide (Nylon), polyimide (PI), and/or mixtures thereof. In some embodiments, the polymer may be polysulfone. In some embodiments, the porous material may comprise a polysulfone based ultrafiltration membrane. In some embodiments, the porous material may comprise hollow fibers. The hollow fibers may be casted or extruded. The hollow fibers may be made, for example, as described in U.S. Pat. Nos. 4,900,626; 6,805,730 and U. S. Patent Application Publication No. 2015/0165389, which are incorporated by reference for their disclosure related to methods of preparing hollow fibers.

Some membranes further comprise a salt rejection layer, e.g. disposed on the GO-MPD layer. A salt rejection layer may comprise any material that is suitable for preventing the passage of salts. Some salt rejection layers comprise a polymer, such as a polyamide or a mixture of polyamides. In some embodiments, the polyamide can be a polyamide made from an amine (e.g. meta-phenylenediamine, para-phenylenediamine, ortho-phenylenediamine, piperazine, polyethylenimine, polyvinylamine, or the like) and an acyl chloride (e.g. trimesoyl chloride, isophthaloyl chloride, or the like). In some embodiments, the amine can be meta-phenylenediamine. In some embodiments, the acyl chloride can be trimesoyl chloride. In some embodiments, the polyamide can be made from a meta-phenylenediamine and a trimesoyl chloride (e.g. by polymerization of meta-phenylenediamine and/or trimesoyl chloride). In some embodiments, having the salt rejection layer include the same type of structural feature as the GO-MPD membrane (also made from MPD) upon which it is disposed can avoid adverse interaction between the two layers.

As mentioned above, some membranes may further comprise a protective coating. For example, the protective coating can be disposed on top of the membrane to protect it from the environment. The protective coating may have any composition suitable for protecting a membrane from the environment, Many polymers are suitable for use in a protective coating such as one or a mixture of hydrophilic polymers, e.g. polyvinyl alcohol (PVA), polyvinyl pyrrolidone (PVP), polyethylene glycol (PEG), polyethylene oxide (PEO), polyoxyethylene (POE), polyacrylic acid (PAA), polymethacrylic acid (PMMA) and polyacrylamide (PAM), polyethylenimine (PEI), poly(2-oxazoline), polyethersulfone (PES), methyl cellulose (MC), chitosan, poly (allylamine hydrochloride) (PAH) and poly (sodium 4-styrene sulfonate) (PSS), and any combinations thereof. In some embodiments, the protective coating can comprise PVA.

Figure 2A:
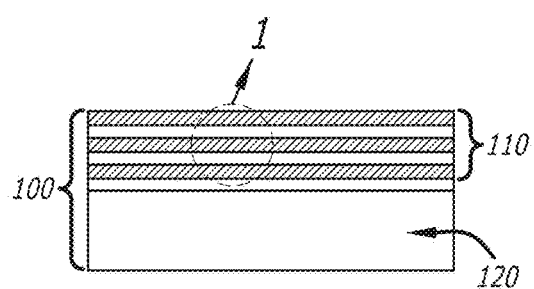
FIGS. 2A-2B is a depiction of two possible embodiments of membranes without a salt rejection layer or a protective coating.
Figure 2B:
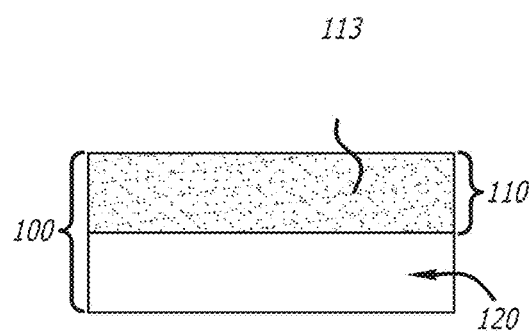
Figure 3A:
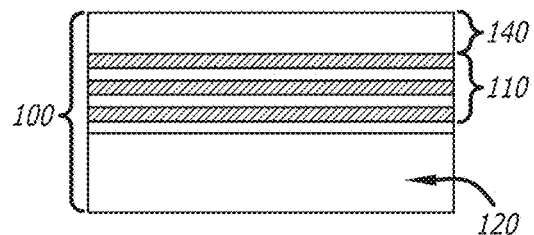
FIGS. 3A-3B is a depiction of two possible embodiments of membranes without a salt rejection layer but with a protective coating.
Figure 3B:
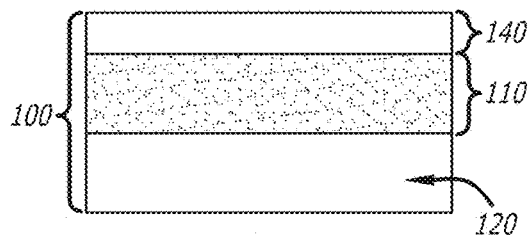

Some non-limiting examples of a membrane 100 without a salt rejection layer may be configured as shown in FIGS. 2A, 2B, 3A and 3B. The membrane 100 can comprise at least a substrate 120 and a cross-linked graphene material layer 110. In some embodiments, as shown in FIGS. 3A and 3B, the membrane may further comprise a protective coating, 140. In some embodiments, as shown in FIGS. 2A and 2B, the membrane can be without a protective coating. In some embodiments, the cross-linked graphene material layer, 110, can be initially constructed to have alternating layers of graphene oxide, 111, and cross-linker, 112. In some embodiments, the cross-linked graphene material layer may comprise a single layer of a mixture of graphene oxide and cross-linker, 113. In some embodiments, the substrate may be sandwiched between two aforementioned membranes. In some embodiments, the membrane can allow the passage of water and/or water vapor, but resists the passage of gases. In some embodiments, as a result of the layers, the membrane may provide a means of removal of water from a control volume by allowing water vapor to pass through but excluding the passage of other gases; resulting in passive dehydration.

In some embodiments, the membrane can be used to remove water or water vapor from a control volume while hindering the passage of solutes or other fluids, such as gases. In some embodiments, a membrane may be disposed between or separate a fluidly communicated first fluid reservoir and a second fluid reservoir. In some embodiments, the first reservoir may contain a feed fluid upstream and/or at the membrane. In some embodiments, the fluid upstream can comprise a gas and water vapor. In some embodiments, the second reservoir may contain a processed fluid downstream and/or at the membrane. In some embodiments, the fluid downstream can have less humidity than that of the first reservoir. In some embodiments, the membrane selectively allows water or water vapor to pass through while resisting the passage of gas, solute, or liquid material from passing through. In some embodiments, the membrane may provide a filter to selectively remove solute and/or suspended contaminants from feed fluid. In some embodiments, the membrane has a desired flow rate. In some embodiments, the membrane may comprise ultrafiltration material.

In some embodiments, the membrane can exhibit a water vapor permeability of about 15-100 $\mu g \cdot m^{-2} \cdot s^{-1} \cdot Pa^{-1}$, about 20-90 $\mu g \cdot m^{-2} \cdot s^{-1} \cdot Pa^{-1}$ about 25-90 $\mu g \cdot m^{-2} \sim s^{-1} \cdot Pa^{-1}$ about 30-60 $\mu g \cdot m^{-2} \cdot s^{-1} \cdot Pa^{-1}$, about 30-40 $\mu g \cdot m^{-2} \cdot s^{-1} \cdot Pa^{-1}$, about 40-60 $\mu g \cdot m^{-2} \cdot s^{-1} \cdot Pa^{-1}$, about 40-50 $\mu g \cdot m^{-2} \cdot s^{-1} \cdot Pa^{-1}$, or about 50-60 $\mu g \cdot m^{-2} \cdot s^{-1} \cdot Pa^{-1}$. In some embodiments, the membrane can also have a maximum $N_2$ gas leakage rate of about 1000 cc/min, about 500 cc/min, about 100 cc/min, about 40 cc/min, about 25 cc/min, about 5 cc/min, less than 10 cc/min, or less than 5 cc/min.

Figure 4A:
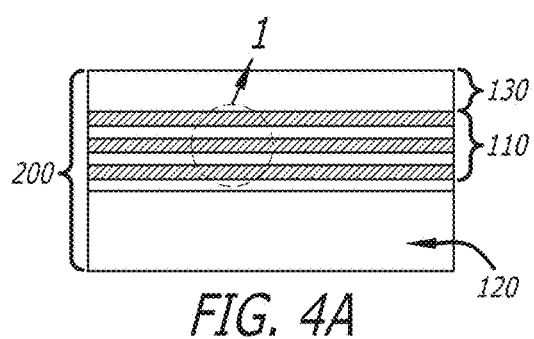
FIGS. 4A-4B is a depiction of two possible embodiments of membranes with a salt rejection layer but without a protective coating.
Figure 4B:
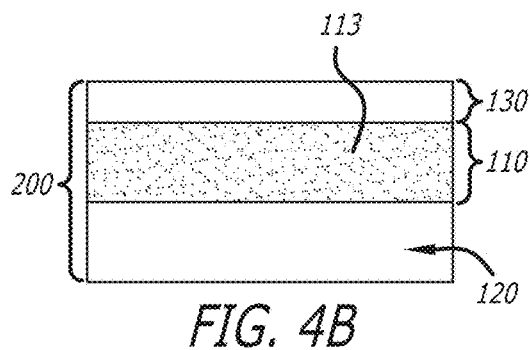
Figure 5A:
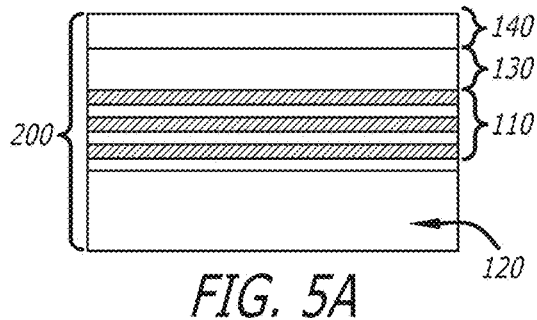
FIGS. 5A-5B is a depiction of two possible embodiments of membranes with a salt rejection layer and a protective coating.
Figure 5B:
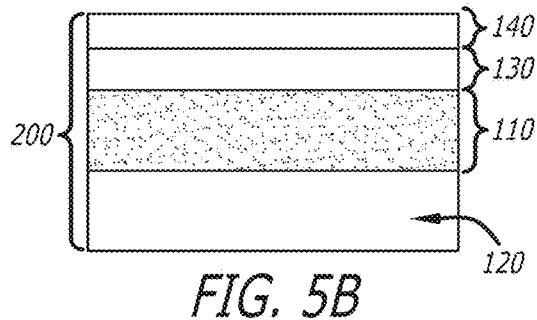

Some non-limiting examples of a membrane 200 comprising a salt rejection layer 130 may be configured as shown in FIGS. 4A, 4B, 5A, and 5B. In some embodiments, the membrane 200 can comprise at least a substrate 120 a cross-linked graphene material layer 110 and a salt rejection layer 130. In some embodiments, the salt rejection layer 130 may be disposed on top of the cross-linked graphene material layer 110. In some embodiments, as shown in FIGS. 5A and 5B, the membrane may further comprise a protective coating, 140, wherein the protective coating can protect the components of the membrane from harsh environments. In some embodiments, as shown in FIGS. 4A and 4B, the membrane can be without a protective coating. In some embodiments, the cross-linked graphene material layer 110 may be initially constructed to have an alternating layer of graphene material 111 and cross-linker 112. In some embodiments, the cross-linked graphene material layer may comprise a single layer of a mixture of graphene material and cross-linker 113. In some embodiments, the substrate may be sandwiched between two layers comprising GO-MPD.

In some embodiments, the membrane selectively allows water or water vapor to pass through while keeping gas, solute, or liquid material from passing through. In some embodiments, as a result of the layers, the membrane may provide a durable desalination system that can be selectively permeable to water, and less permeable to salts. In some embodiments, as a result of the layers, the membrane may provide a durable reverse osmosis system that may effectively filter saline water, polluted water or feed fluids.

In some embodiments, the membrane exhibits a normalized volumetric water flow rate of about 10-1000 $gal \cdot ft^{-2} \cdot day^{-1} \cdot bar^{-1}$; about 20-750 $gal \cdot ft^{-2} \cdot day^{-1} \cdot bar^{-1}$; about 100-500 $gal \cdot ft^{-2} \cdot day^{-1} \cdot bar^{-1}$; about 200-400 $gal \cdot ft^{-2} \cdot day^{-1} \cdot bar^{-1}$, at least about 10 $gal \cdot ft^{-2} \cdot day^{-1} \cdot bar^{-1}$, about 20 $gal \cdot ft^2 \cdot day^{-1} \cdot bar^{-1}$, about 100 $gal \cdot ft^{-1} \cdot day^{-1} \cdot bar^{-1}$, about 200 $gal \cdot ft^2 \cdot day^{-1} \cdot bar^{-1}$ or a normalized volumetric water flow rate in a range bounded by any of these values.

In some embodiments, the cross-linked graphene oxide layer may have an average pore size or fluid passageway of an average diameter of about 0.01 μm (10 nm) to about 0.1 μm (100 nm), and/or about 0.01 μm (10 nm) to about 0.05 μm (50 nm).

In some embodiments, a membrane may be a selectively permeable. In some embodiments, the membrane may be an osmosis membrane. In some embodiments, the membrane may be a water separation membrane. In some embodiments, a water permeable- and/or solute impermeable membrane containing graphene material, such as graphene oxide, may provide desired selective gas, liquid, and/or vapor permeability resistance. In some embodiments, the membrane may be a reverse osmosis (RO) membrane. In some embodiments, the selectively permeable membrane may comprise multiple layers, wherein at least one layer contains graphene material.

III. Cross-Linked GO

The membranes described herein have a cross-linked optionally substituted graphene oxide. These optionally substituted cross-linked graphene oxides include an optionally substituted graphene that is cross-linked with a water-soluble cross-linkage, or which are a product cross-linking graphene oxide with a water-soluble cross-linking agent. For the purposes of this disclosure, the term "cross-linking" is interchangeable with the term "crosslinking".

A. Graphene Oxide

Graphene materials have many attractive properties, such as a 2-dimensional sheet-like structure with extraordinary high mechanical strength and nanometer scale thickness. The graphene oxide (GO), an exfoliated oxidation of graphite, can be mass produced at low cost. With its high degree of oxidation, graphene oxide has high water permeability and also exhibits versatility to be functionalized by many functional groups, such as amines or alcohols to form various membrane structures. Unlike traditional membranes, where the water is transported through the pores of the material, in graphene oxide membranes the transportation of water can be between the interlayer spaces. Graphene oxide's capillary effect can result in long water slip lengths that offer fast water transportation rate. Additionally, the membrane's selectivity and water flux can be controlled by adjusting the interlayer distance of graphene sheets.

Layered GO membranes with lamellar structure can be fabricated by vacuum filtration process of GO aqueous solution, but may be highly susceptible to be dispersed in aqueous environment under high flux. To solve this issue, the GO sheets can be cross-linked firmly to withstand the water flux while keeping the lamellar structure.

It is believed that there may be a large number (~30%) of epoxy groups on the basal plane of GO, which may be readily reactive with amine groups at elevated temperatures. It is also believed that GO sheets have an extraordinary high aspect ratio which provides a large available gas/water diffusion surface as compared to other materials, and it has the ability to decrease the effective pore diameter of any substrate supporting material to minimize contaminant infusion while retaining flux rates. It is also believed that the epoxy or hydroxyl groups increases the hydrophilicity of the materials, and thus contributes to the increase in water vapor permeability and selectivity of the membrane.

In some embodiments, the optionally substituted graphene oxide may be in the form of sheets, planes or flakes. In some embodiments, the graphene material may have a surface area of about 100 $m^2/g$ to about 5000 $m^2/g$, about 150 $m^2/g$ to about 4000 $m^2/g$, about 200 $m^2/g$ to about 1000 $m^2/g$, about 500 $m^2/g$ to 1000 $m^2/g$, about 1000 $m^2/g$ to about 2500 $m^2/g$, about 2000 $m^2/g$ to about 3000 $m^2/g$, about 100 $m^2/g$ to 500 $m^2/g$, about 400 $m^2/g$ to about 500 $m^2/g$, or any surface area in a range bounded by any of these values.

In some embodiments, the graphene oxide may be platelets having 1, 2, or 3 dimensions with size of each dimension independently in the nanometer to micron range. In some embodiments, the graphene may have a platelet size in any one of the dimensions, or may have a square root of the area of the largest surface of the platelet, of about 0.05-100 μm, about 0.05-50 μm, about 0.1-50 μm, about 0.5-10 μm, about 1-5 μm, about 0.1-2 μm, about 1-3 μm, about 2-4 μm, about 3-5 μm, about 4-6 μm, about 5-7 μm, about 6-8 μm, about 7-10 μm, about 10-15 μm, about 15-20 μm, about 50-100 μm, about 60-80 μm, about 50-60 μm, about 25-50 μm, or any platelet size in a range bounded by any of these values.

In some embodiments, the graphene material can comprise at least 70%, at least 75%, at least 80%, at least 85%, at least 90%, at least 95%, at least 97%, or at least 99% of graphene material having a molecular weight of about 5000 Daltons to about 200,000 Daltons.

In some embodiments, the optionally substituted graphene oxide may be unsubstituted. In some embodiments, the optionally substituted graphene oxide may comprise a non-functionalized graphene base. In some embodiments, the graphene material may comprise a functionalized graphene base. Functionalized graphene includes one or more functional groups not present in graphene oxide, such as functional groups that are not OH, COOH or epoxide group directly attached to a C-atom of the graphene base. Examples of functional groups that may be present in functionalized graphene include halogen, alkene, alkyne, CN, ester, amide, or amine.

Graphene oxide includes any graphene having epoxy substituents and saturated carbon atoms. In some embodiments, the graphene material, such as optionally substituted graphene oxide, may comprise a functionalized graphene base. In some embodiments, more than: about 90%, about 80%, about 70%, about 60% about 50%, about 40%, about 30%, about 20%, or about 10% of the optionally substituted graphene oxide may be functionalized. In other embodiments, the majority of optionally substituted graphene oxide may be functionalized. In still other embodiments, substantially all the optionally substituted graphene oxide may be functionalized. In some embodiments, the functionalized graphene oxide may comprise a graphene base and functional compound. In some embodiments, the graphene base can be graphene oxide (GO), reduced-graphene oxide (RGO), functionalized graphene oxide, functionalized and reduced-graphene oxide, or any combination thereof.

In some embodiments, the functionalized graphene contains multiple types of functional groups in addition to at least one epoxide group. In some embodiments, there is only one type of functional groups in the functionalized graphene.

In some embodiments, the epoxide groups can be the by-product of oxidation of the graphene to create graphene oxide. In some embodiments, the epoxide groups are formed on the surface of the graphene base by additional chemical reactions. In some embodiments, the epoxide groups are formed during oxidation and additional chemical reactions.

In some embodiments, the mass percentage of the graphene base relative to the total composition of the graphene containing layer can be about 1 wt % to about 95 wt %, about 10 wt % to about 95 wt %, about 30 wt % to about 80 wt %, about 20-50 wt %, about 30-50 wt %, about 40-60 wt %, about 60-80 wt %, or 80-95 wt %.

In some embodiments, the selectively permeable membrane can comprise crosslinked, optionally substituted graphene oxide. In some embodiments, the crosslinked, optionally substituted graphene oxide comprises a cross-linking group covalently bonding adjacent optionally substituted graphene oxides. In some embodiments, the optionally substituted graphene material may be a crosslinked graphene, where the graphene material may be crosslinked with at least one other graphene base by a cross-linker material/bridge. it is believed that crosslinking the graphene material can enhance the membrane's mechanical strength and water permeable properties by creating strong chemical bonding and wide channels between graphene platelets to allow water to pass through the platelets easily. In some embodiments, the graphene material may comprise crosslinked graphene material at the graphene bases having at least about 1%, about 5%, about 10%, about 20%, about 30%, about 40% about 50%, about 60%, about 70%, about 80%, about 90%, about 95%, or all of the graphene material crosslinked. In some embodiments, the majority of the graphene material may be crosslinked. In some embodiments, some of the graphene material may be crosslinked with at least 5% of the graphene material crosslinked with other graphene material. The amount of crosslinking may be estimated based on the weight of the cross-linker as compared with the total amount of graphene material. In some embodiments, one or more of the graphene base(s) that are crosslinked may also be functionalized. In some embodiments, the graphene material may comprise both crosslinked and non-crosslinked graphene, as well as crosslinked, functionalized, functionalized and non-crosslinked graphene.

In some embodiments, the adjacent optionally substituted graphene oxides can be covalently bonded to each other by an optionally substituted phenylenediamine cross-linker. The resulting cross-linked graphene oxide can be represented as following:

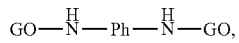

wherein GO represents an optionally substituted graphene oxide and Ph represents an optionally substituted phenylene.

In some embodiments, the phenylenediamine cross-linker is an optionally substituted meta-phenylenediamine as shown in Formula 2:

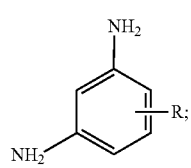

wherein R is H, or an optionally substituted carboxylic acid. In some embodiments, the substituents can be Na, K, or Li. In some embodiments, R is H, $CO_2H$, $CO_2Li$, $CO_2Na$, and/or $CO_2K$. For example, the optionally substituted meta-phenylenediamine can be:

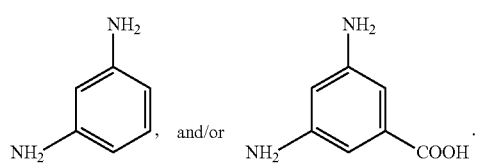

When the cross-linker is a salt, such as sodium salt, potassium salt, or lithium salt, the hydrophilicity of the resulting GO membrane could be increased, thereby increasing the total water flux.

In some embodiments, a cross-linkage containing two C—N bonds between optionally substituted graphene oxides (GOs) can be generated by a ring opening reaction of an epoxide group in each of the optionally substituted graphene oxide with each of the 2 amine groups of a phenylene diamine cross-linker. Examples of the reactions are shown in Scheme 1 below where unsubstituted meta-phenylenediamine is used.

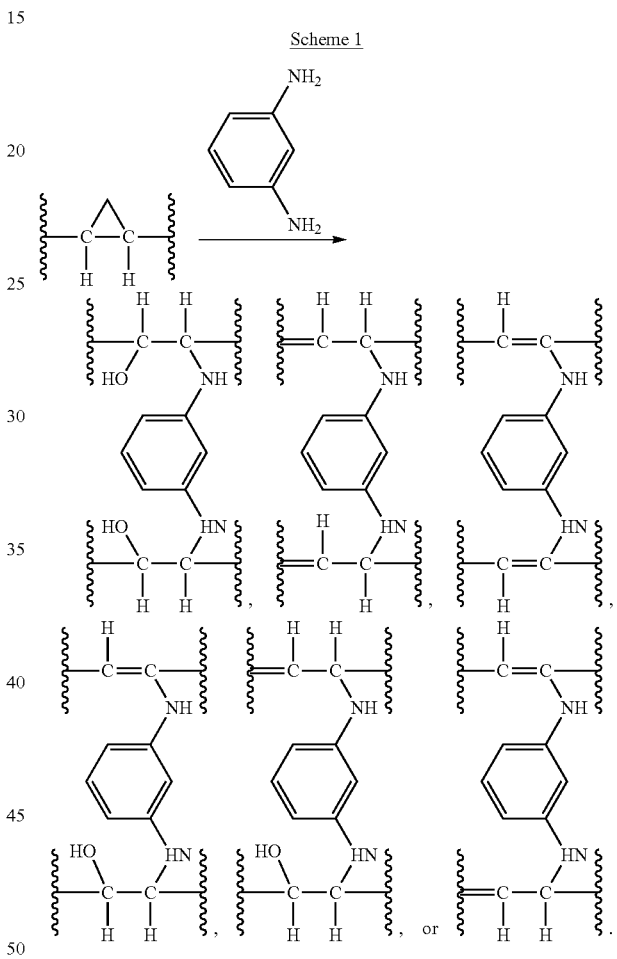

In some embodiments, the reaction between the optionally substituted meta-phenylenediamine and the optionally substituted graphene oxides can form a cross-linkage between two vertically stacked graphene oxides as represented in Scheme 2 below.

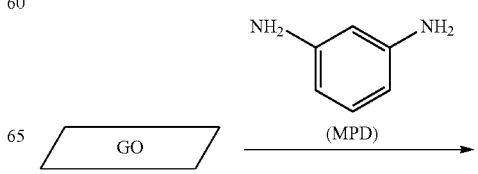

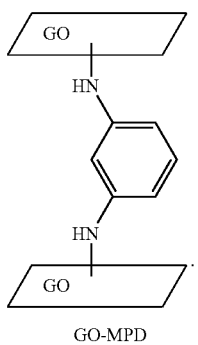

GO-MPD

In some embodiments, an optionally substituted phenylenediamine crosslinker, such as substituted meta-phenylenediamine or unsubstituted meta-phenylenediamine crosslinks to a first interior carbon atom on a face of the first optionally substituted graphene oxide platelet and to a second interior carbon atom on a face of the second optionally substituted graphene oxide platelet. An interior carbon atom on a face of an optionally substituted graphene oxide platelet is a carbon atom that is not on an outer border of the optionally substituted graphene oxide platelet. For example, for the graphene oxide platelet depicted below, the interior carbon atoms on the face of the GO are shown in bold, and the remaining carbon atoms are on the outer border of GO. The structure below is depicted only to illustrate the principle of an interior carbon atom, and does not limit the structure of a graphene oxide. For the purposes of this disclosure, the term "crosslinks" is interchangeable with the term "cross-links".

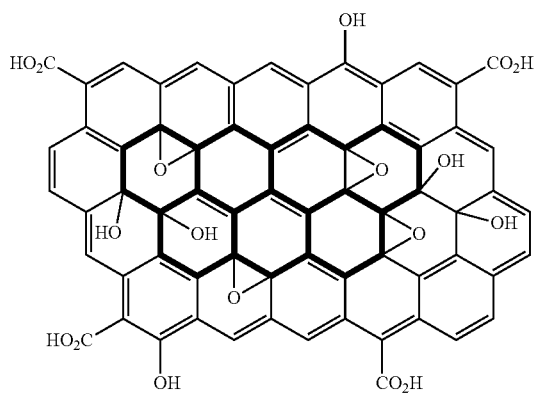

As carboxyl groups are predominantly on the edge of the graphene oxides instead of in the body or planar interior of the graphene where majority of the epoxide groups are located, as depicted above, it is believed that forming C—N bonds from the epoxide functional groups instead of forming amide bonds from carboxylic acid groups on the GOs via reactions with crosslinkers can result in higher degree of crosslinking between vertically stacked graphene oxides (i.e., crosslinks to the graphene's surfaces). Furthermore, this in-plane bonding between adjacent graphene materials may allow for a lamellar layered GO structure to resist dispersion in water without the need for polymers in addition to the cross-linker.

In some embodiments, the weight ratio of MPD/GO (weight ratio=weight of meta-phenylenediamine cross-linker÷weight of optionally substituted graphene oxide) can be about 0.05-100, about 0.1-100, about 0.2-50, about 1-10, about 1-5, about 5-10, about 5-8, about 6-10, about 6-8, or about 7 (for example 7 mg of meta-phenylenediamine cross-linker and 1 mg of optionally substituted graphene oxide), or any ratio in a range bounded by any of these values.

In some embodiments, an optionally substituted graphene oxide, crosslinked with a substituted phenylenediamine, such as a substituted m-phenylenediamine or an unsubstituted phenylenediamine, such as unsubstituted m-phenylenediamine, can have about 5-60 atom %, about 5-10 atom %, about 10-15 atom %, about 15-20 atom %, about 15-25 atom %, about 20-40 atom %, about 20-25 atom %, about 30-35 atom %, about 40-60 atom %; at least: about 5 atom %, about 7 atom %, about 10 atom %, about 12 atom %, about 14 atom %, about 15 atom %, about 16 atom %, about 17 atom %, about 18 atom %, about 19 atom %, or about 20 atom %; about 21 atom %, about 34%, or about 33%; or any atom % of oxygen atom in a range bounded by any of these values. The percentage of crosslinking can be determined by X-ray photoelectron spectroscopy (XPS).

In some embodiments, an optionally substituted graphene oxide, crosslinked with a substituted phenylenediamine, such as a substituted m-phenylenediamine or an unsubstituted phenylenediamine, such as unsubstituted m-phenylenediamine, can have about 20-90 atom %, about 30-80 atom %, about 40-75 atom %, about 60-75 atom %, about 60-70 atom %, about 50-70 atom %, about 60-65 atom %, about 68%, about 63% of carbon atom, or any atom % of carbon atom in a range bounded by any of these values. The percentage of carbon atom can be determined by XPS.

In some embodiments, an optionally substituted graphene oxide, crosslinked with a substituted phenylenediamine, such as a substituted m-phenylenediamine or an unsubstituted phenylenediamine, such as unsubstituted m-phenylenediamine, can have a carbon to oxygen atom ratio (C/O) of about 1-5.5, about 1.5-5, about 1-5, about 1-4, about 1-3, about 2-5, about 2-4, about 2-3, about 1.6-4, about 1.7-3.5, about 1.8-3.3, about 3-4, about 3-3.5, about 1-2, about 1.5-2, about 3.2, or about 1.9, or any atom ratio of C/O in a range bounded by any of these values.

In some embodiments, an optionally substituted graphene oxide, crosslinked with a substituted phenylenediamine, such as a substituted m-phenylenediamine or an unsubstituted phenylenediamine, such as unsubstituted m-phenylenediamine, can have less than about 20 atom %, less than about 15 atom %, less than about 13 atom %, less than 11.5 atom %, less than about 11 atom %, less than about 10 atom %, about 10-11 atom %, about 10.9 atom %, about 1-20 atom %, about 3-6 atom %, about 5-15 atom %, about 9-13 atom %, about 10-12 atom % of nitrogen, or any atom percent in a range bounded by any of these values. The percentage of nitrogen atoms, which may reflect the degree of crosslinking in GO-MPD membrane, can be determined by XPS.

In some embodiments, an optionally substituted graphene oxide, crosslinked with a substituted phenylenediamine, such as a substituted m-phenylenediamine or an unsubstituted phenylenediamine, such as unsubstituted m-phenylenediamine, can have an interlayer distance or d-spacing of about 0.5-3 nm, about 0.6-2 nm, about 0.7-1.7 nm, about 0.8-1.5 nm, about 0.9-1.5 nm, about 1.4-1.5 nm, about 0.9-1 nm, about 1.4 nm, about 1.43, about 0.9 nm, about 0.93 nm, or any distance in a range bounded by any of these values. The d-spacing can be determined by x-ray powder diffraction (XRD).

The GO-MPD layer may have any suitable thickness. For example, some GO-MPD layers may have a thickness of about 5-200 nm, 10-100 nm, about 10-50 nm, about 10-20 nm, about 20-30 nm, about 30-40 nm, about 40-50 nm, about 50-70 nm, about 70-100 nm about 10 nm, 12 nm, about 20 nm, about 30 nm, about 40 nm, about 50 nm, about 60 nm, about 80 nm, about 100 nm, or any thickness in a range bounded by any of these values.

IV. Methods of Controlling Water or Solute Content

Some embodiments include methods for controlling the water content in a fluid. In some embodiments, the fluid can comprise a liquid. In some embodiments, the fluid can comprise a gas. In some embodiments, the gas can comprise multiple gases including water vapor. In some embodiments, the method controls the concentration of water vapor in a gas. In some embodiments, the method controls the concentration of water in a liquid. In some embodiments, the fluid containing high concentration of water can be an unprocessed fluid. In some embodiments, the method can provide removal of water from the unprocessed fluid, or dehydration, to reach desired water concentrations of the unprocessed fluid; thereby to yield a processed fluid.

In some embodiments, a method of dehydrating of an unprocessed fluid comprises contacting the unprocessed fluid to the one or more of the aforementioned membranes. In some embodiments, contacting the unprocessed fluid to the membrane can result in allowing the water to pass through the membrane to a second fluid, or effluent. In some embodiments, exposing the unprocessed fluid to the membrane further comprises allowing sufficient time for the water to pass through the membrane so that the processed fluid achieves the desired water concentration. In some embodiments, the unprocessed fluid is in a gaseous phase, wherein the water being removed is water vapor. In some embodiments, the unprocessed fluid is in the liquid phase, wherein the water being removed is liquid water. In some embodiments, the method comprises allowing water vapor to pass through the membrane. In some embodiments, the method comprises allowing liquid water to pass through the membrane. In some embodiments, the method comprises allowing a combination of water vapor and liquid water to pass through the membrane. The desired water concentration can be a concentration (but not limited to), of water vapor content in an enclosed space that is below the level which would result in condensation, mold growth, and/or spoliation of food.

In some embodiments, passing the water through the membrane can be by osmosis, or under the power of osmotic pressure. In some embodiments, the method further comprises providing a pressure gradient across the membrane to force the water passing through the membrane to overcome osmotic back pressure.

In some embodiments, methods of extracting liquid water from an aqueous solution containing dissolved solutes, for applications such as pollutant removal or desalination are described. In some embodiments, a method for removing a solute from an unprocessed solution can comprise contacting the unprocessed solution to one or more of the aforementioned membranes. In some embodiments, the method further comprises passing the solution through the membrane. In some embodiments, passing the water containing solute through the membrane can be accomplished by supplying a means of producing head pressure. In some embodiments, the head pressure can be sufficient to overcome osmotic back pressure. In some embodiments, the method comprises retaining the solutes by the membrane while allowing water to pass through, thereby reducing the solute content of the water. In some embodiments, the method can further comprise providing a pressure gradient across the membrane.

In some embodiments, providing a pressure gradient across the membrane can be achieved by producing a positive pressure in the first reservoir, producing a negative pressure in the second reservoir, or producing a positive pressure in the first reservoir and producing a negative pressure in the second reservoir. In some embodiments, a means of producing a positive pressure in the first reservoir can be accomplished by using a piston, a pump, a gravity drop, and/or a hydraulic ram. In some embodiments, a means of producing a negative pressure in the second reservoir can be achieved by applying a vacuum or withdrawing fluid from the second reservoir.

V. Methods of Fabricating Membranes

Figure 6:
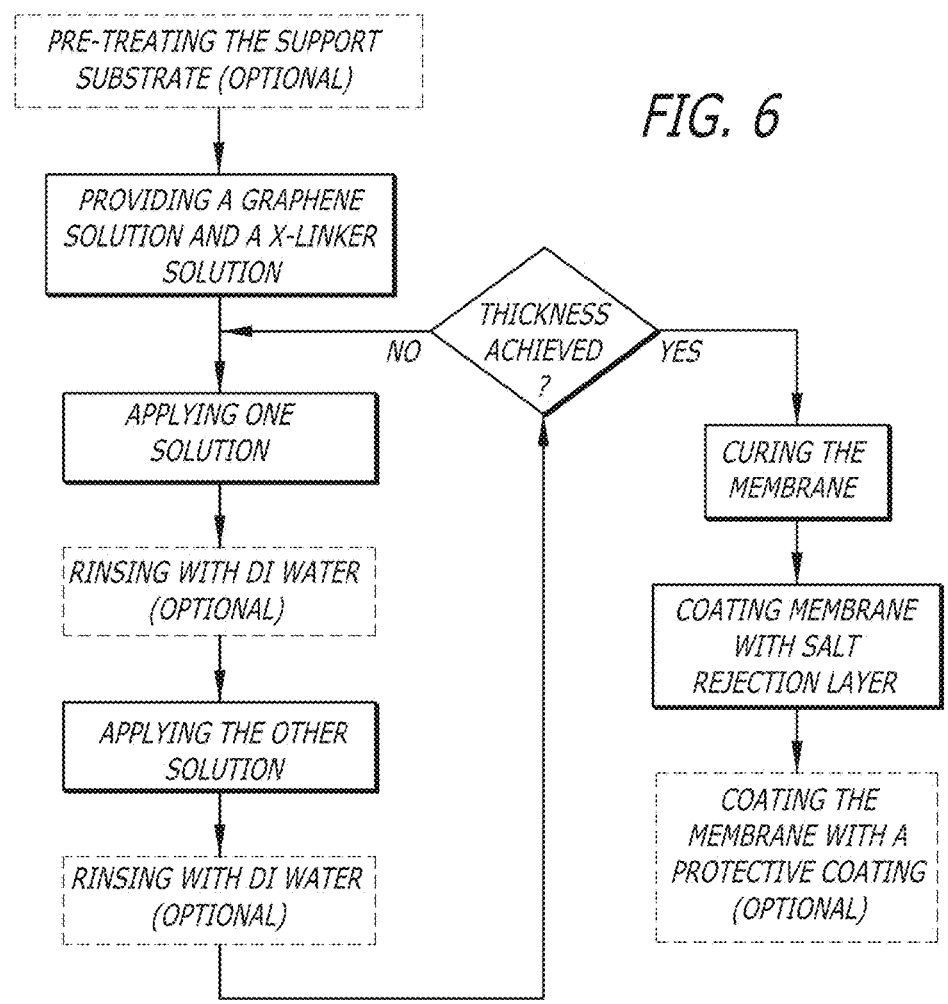
FIG. 6 is a depiction of a possible embodiment for the method for making a membrane—Layer-by-Layer Method.
Figure 7:
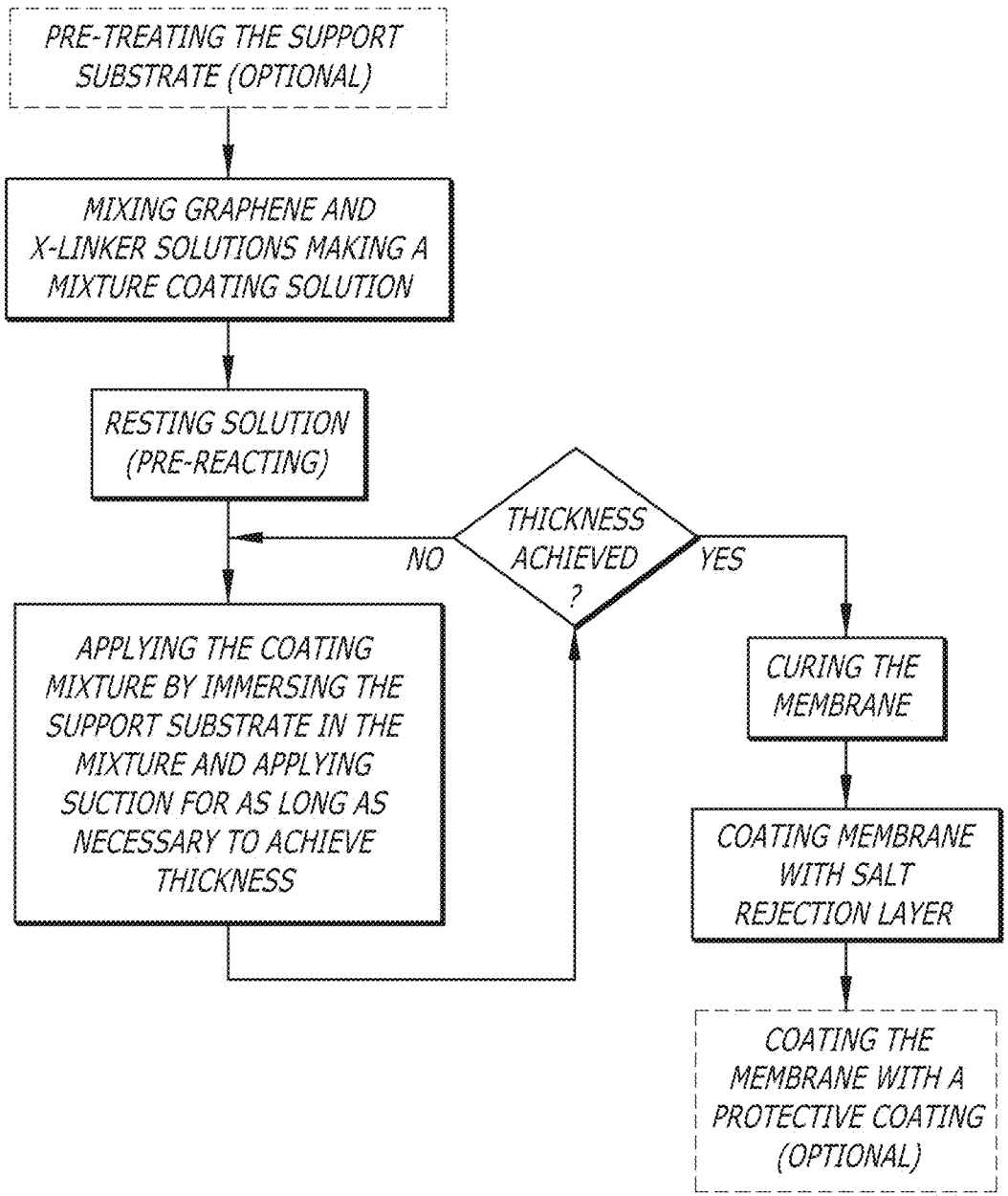
FIG. 7 is a depiction of a possible embodiment for the method of making a membrane—Filter Method
Figure 8:
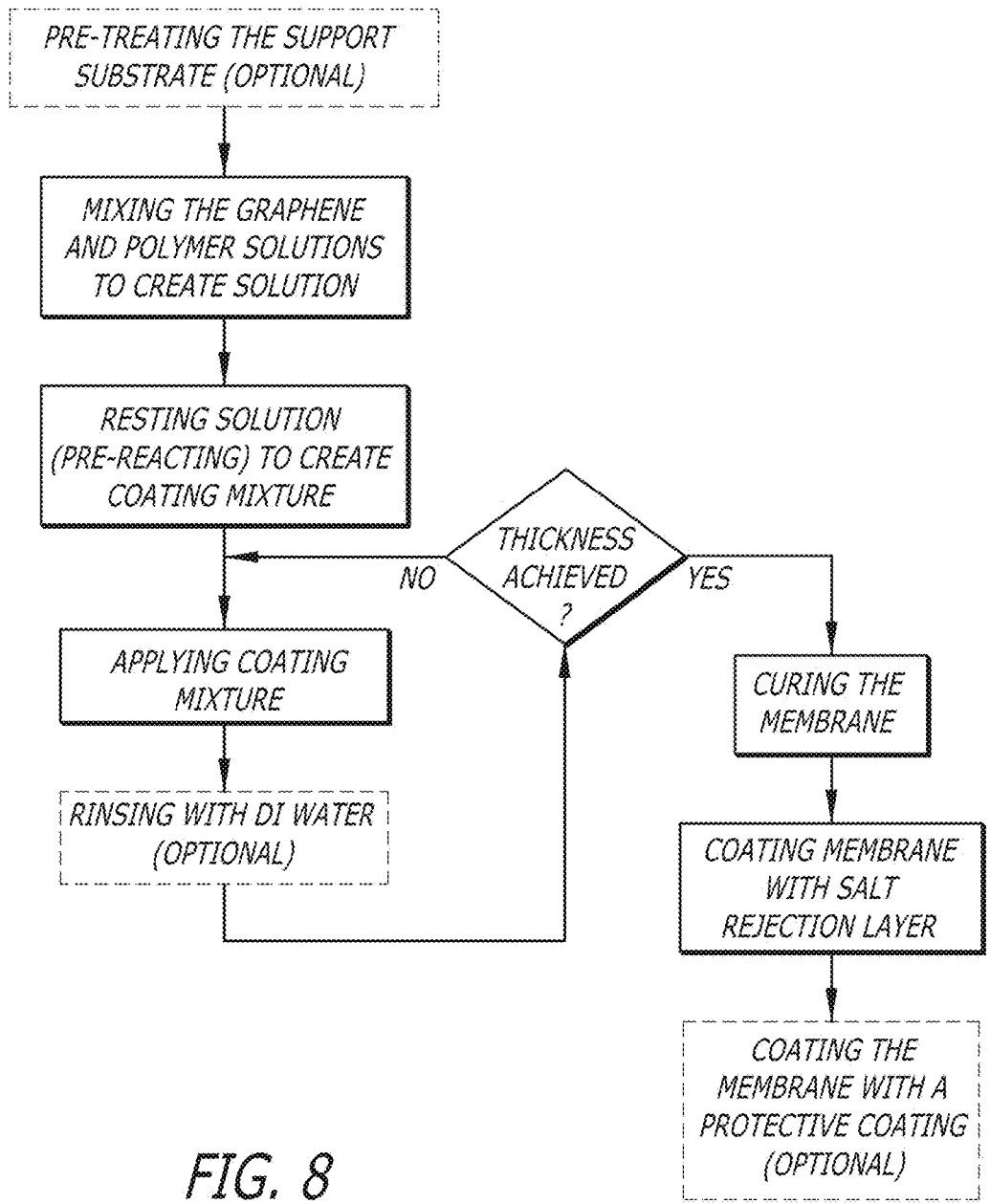
FIG. 8 is a depiction of a possible embodiment for the method of making a membrane—Mixture Coating Method.

Some embodiments include methods for making a membrane comprising: preparing solutions of graphene oxide and a cross-linker, applying the solutions to a substrate, and curing the mixture on a substrate. In some embodiments, a layer-by-layer method is used, wherein applying the solutions to the substrate comprises applying layer by layer of a plurality of alternating layers of graphene oxide and cross-linker to the substrate. A non-limiting example is shown in FIG. 6. In some embodiments, a filtering method is used, wherein applying the solutions to the substrate comprises applying a single layer of a mixed graphene oxide and cross-linker solution and then filtering the resulting coating solution through the pretreated substrate. A non-limiting example is shown in FIG. 7. In some embodiments, a mixture coating method is used, wherein applying a single layer or a plurality of layers of a mixed graphene oxide and cross-linker coating solution to the pretreated substrate to form one or a plurality of layers. A non-limiting example is shown in FIG. 8. In some embodiments, the graphene oxide comprises optionally substituted graphene oxide. In some embodiments, the cross-linker comprises optionally substituted meta-phenylenediamine.

In some embodiments, the method of making a membrane comprises: (a) mixing an optionally substituted graphene oxide and a cross-linker to get an aqueous solution; (b) resting the solution for 30 minutes to 12 hours to create a coating mixture; (c) applying the coating mixture to a substrate; (d) repeating step (c) as necessary to achieve the desired thickness or number of layers; and (e) curing the optionally substituted graphene oxide and the cross-linker upon the substrate at 50° C. to 120° C. for 15 minutes to 2 hours so that the optionally substituted graphene oxide and the cross-linker are covalently bonded. In some embodiments, applying the coating mixture to the substrate can be achieved by immersing the substrate into the coating mixture first, and then drawing the solution onto the substrate by applying a negative pressure gradient across the substrate until the desired coating thickness can be achieved. In some embodiments, applying the coating mixture to the substrate can be achieved by blade coating, spray coating, dip coating, or spin coating. In some embodiments, the method can further comprise rinsing the substrate with deionized water after application of the coating mixture. In some embodiments, the method can further comprise applying a salt rejection layer.

Some embodiments include a method of making a membrane from an optionally substituted meta-phenylenediamine cross-linker and an optionally substituted graphene oxide comprising: (a) separately applying an optionally substituted graphene oxide aqueous solution and an optionally substituted meta-phenylenediamine cross-linker aqueous solution to a substrate; (b) repeating step (a) as necessary to achieve the desired thickness or number of layers; and (c) curing the optionally substituted graphene oxide and the cross-linker upon the substrate at 50-120° C. for 15 minutes to 2 hours so that the optionally substituted graphene oxide and optionally substituted meta-phenylenediamine cross-linker can covalently bond. Applying the aqueous solutions to the substrate can be achieved by methods such as blade coating, spray coating, dip coating, spin coating, etc. Some methods can further comprise rinsing the substrate with deionized water after each application of either an optionally substituted meta-phenylenediamine cross-linker aqueous solution or an optionally substituted graphene oxide aqueous solution. In some embodiments, the method can further comprise applying a salt rejection layer.

In some embodiments, the method comprises optionally pre-treating a substrate to assist in the adhesion of the graphene oxide to the substrate. In some embodiments, pretreating the substrate comprises treating the substrate with a dopamine solution. In some embodiments, the dopamine solution can be polymerized to form polydopamine on the substrate. In some embodiments, the method comprises drying the pretreated substrate at about 40-90° C. In some embodiments, the pretreated substrate can be dried at about 65° C.

In some embodiments, the method comprises applying a graphene oxide aqueous solution and a cross-linker aqueous solution to the substrate. In some embodiments, applying a graphene oxide aqueous solution and a cross-linker aqueous solution to the substrate can be achieved by layer-by-layer method, filter method, or mixture coating method, which results a coated substrate. In some embodiments, the application procedure can be repeated until the desired thickness or number of layers of the graphene oxide and the cross-linker are achieved. In some embodiments, the thickness or number of layers is defined so that the resulting membrane meets the aforementioned membrane performance criteria. In some embodiments, the desired thickness of membrane can range from about 5-2000 nm, about 5-1000 nm, about 1000-2000 nm, about 10-500 nm, about 500-1000 nm, about 50-300 nm, about 10-200 nm, about 10-100 nm, about 10-50 nm, about 20-50 nm, or about 50-100. In some embodiments, the number of layers can range from 1 to 250, from 1 to 100, from 1 to 50, from 1 to 20, from 1 to 15, from 1 to 10, or from 1 to 5. This process results in a fully coated substrate. In some embodiments, the method further comprises heating the fully coated substrate to facilitate the crosslinking, or forming covalent bonding, of the graphene oxide and the cross-linker. In some embodiments, the fully coated substrate can be heated in an oven at about 50-120° C., about 40-150° C., about 50-100° C., about 80-90° C., about 40-60° C., about 120° C., about 50° C., or about 80° C. In some embodiments, the fully coated substrate can be heated for a period of about 15 minutes to about 2 hours, about 0.5-1 h, about 1 hour, or about 30 minutes to result a membrane.

In some embodiments, the method for fabricating membranes further comprises applying a salt rejection layer to the membrane or a cured substrate to yield a membrane with a salt rejection layer. In some embodiments, the salt rejection layer can be applied by dipping the cured substrate into a solution of precursors in mixed solvents. In some embodiments, the precursors can comprise an amine and an acyl chloride. In some embodiments, the precursors can comprise meta-phenylenediamine and trimesoyl chloride. In some embodiments, the concentration of meta-phenylenediamine can range from about 0.01-10 wt %, about 0.1-5 wt %, about 5-10 wt %, about 1-5 wt %, about 2-4 wt %, about 4 wt %, about 2 wt %, or about 3 wt %. In some embodiments, the trimesoyl chloride concentration can range from about 0.001 vol % to about 1 vol %, about 0.01-1 vol %, about 0.1-0.5 vol %, about 0.1-0.3 vol %, about 0.2-0.3 vol %, about 0.1-0.2 vol %, or about 0.14 vol %. In some embodiments, the mixture of meta-phenylenediamine and trimesoyl chloride can be allowed to rest for a sufficient amount of time such that polymerization can take place before the dipping occurs. In some embodiments, the method comprises resting the mixture at room temperature for about 1-6 hours, about 5 hours, about 2 hours, or about 3 hours. In some embodiments, the method comprises dipping the cured substrate in the coating mixture for about 15 seconds to about 15 minutes; about 5 seconds to about 5 minutes, about 10 seconds to about 10 minutes, about 5-15 minutes, about 10-15 minutes, about 5-10 minutes, or about 10-15 seconds.

In other embodiments, the salt rejection layer can be applied by coating the cured substrate in separate solutions of aqueous meta-phenylenediamine and a solution of trimesoyl chloride in an organic solvent. In some embodiments, the meta-phenylenediamine solution can have a concentration in a range of about 0.01-10 wt %, about 0.1-5 wt %, about 5-10 wt %, about 1-5 wt %, about 2-4 wt %, about 4 wt %, about 2 wt %, or about 3 wt %. In some embodiments, the trimesoyl chloride solution can have a concentration in a range of about 0.001-1 vol %, about 0.01-1 vol %, about 0.1-0.5 vol %, about 0.1-0.3 vol %, about 0.2-0.3 vol %, about 0.1-0.2 vol %, or about 0.14 vol %. In some embodiments, the method comprises dipping the cured substrate in the aqueous meta-phenylenediamine for a period of about 1 second to about 30 minutes, about 15 seconds to about 15 minutes; or about 10 seconds to about 10 minutes. In some embodiments, the method then comprises removing excess meta-phenylenediamine from the cured substrate. In some embodiments, the method then comprises dipping the cured substrate into the trimesoyl chloride solution for a period of about 30 seconds to about 10 minutes, about 45 seconds to about 2.5 minutes, or about 1 minute. In some embodiments, the method comprises subsequently drying the cured substrate in an oven to yield a membrane with a salt rejection layer. In some embodiments, the cured substrate can be dried at about 45° C. to about 200° C. for a period about 5 minutes to about 20 minutes, at about 75° C. to about 120° C. for a period of about 5 minutes to about 15 minutes, or at about 90° C. for about 10 minutes. This process results in a membrane with a salt rejection layer.

In some embodiments, the method for fabricating a membrane further comprises subsequently applying a protective coating on the membrane. In some embodiments, the applying a protective coating comprises adding a hydrophilic polymer layer. In some embodiments, applying a protective coating comprises coating the membrane with a PVA aqueous solution. Applying a protective layer can be achieved by methods such as blade coating, spray coating, dip coating, spin coating, and etc. In some embodiments, applying a protective layer can be achieved by dip coating of the membrane in a protective coating solution for about 1 minute to about 10 minutes, about 1-5 minutes, about 5 minutes, or about 2 minutes. In some embodiments, the method further comprises drying the membrane at a about 75° C. to about 120° C. for about 5 minutes to about 15 minutes, or at about 90° C. for about 10 minutes. This results in a membrane with a protective coating.

Three methods of applying an optionally substituted graphene oxide (GO) and a cross-linker, such as an optionally substituted meta-phenylenediamine to a substrate, are described below in more detail.

1. Layer-by-Layer Method:

In some embodiments, a layer-by-layer method is used to apply a graphene oxide aqueous solution and a cross-linker aqueous solution, such as an optionally substituted meta-phenylenediamine, to a substrate, wherein the method comprises applying the aforementioned solutions separately layer by layer to form a plurality of layers. In some embodiments, the number of layers can range from 1-100, 1-50, 1-20, 1-15, 1-10, or 1-5, or is 10, wherein a coating of graphene oxide and a coating of optionally substituted meta-phenylenediamine cross-linker is considered a single layer. In some embodiments, the aqueous graphene oxide solution can have a concentration ranging from about 0.0001-0.01 wt %. In some embodiments, the optionally substituted meta-phenylenediamine cross-linker aqueous solution can have a concentration ranging from 0.0001-0.01 wt %. In some embodiments, applying the optionally substituted meta-phenylenediamine cross-linker aqueous solution can be followed by applying the graphene oxide aqueous solution. In other embodiments, applying the graphene oxide aqueous solution can be followed by applying the optionally substituted meta-phenylenediamine cross-linker aqueous solution. In some embodiments, applying the aqueous solutions can be achieved independently by blade coating, spray coating, dip coating, spin coating, or other methods known in the art. In some embodiments, applying the solutions can be done by dip coating the substrate in the respective solution for about 1 minute to about 10 minutes, about 1-5 minutes, or about 5 minutes.

In some embodiments, the layer-by-layer method further comprises rinsing the resulting substrate in deionized (DI) water to remove excess material after the application of either the graphene oxide aqueous solution and/or the optionally substituted meta-phenylenediamine cross-linker aqueous solution to yield a coated substrate.

2. Filtering Method:

In some embodiments, a filtering method is used to apply a graphene oxide aqueous solution and a cross-linker aqueous solution to a substrate, wherein the method comprises creating a mixed coating solution, resting the coating solution to form a coating mixture, and then filtering the coating mixture through the substrate to generate a coated substrate.

In some embodiments, creating a mixed coating solution comprises preparing a single mixed coating solution by mixing aqueous solutions of a graphene oxide and a cross-linker. In some embodiments, creating a mixed coating solution comprises mixing the graphene oxide aqueous solution with a concentration of about 0.0001-0.01 wt %, and the cross-linker aqueous solution with a concentration of about 0.0001-0.01 wt % to yield a coating solution.

In some embodiments, the filtering method comprises resting the coating solution at about room temperature for a period of about 30 minutes to about 12 hours, about 1-6 hours, about 2-5 hours, 2-4 hours, about 5 hours, or about 3 hours. It is believed that resting the coating solution could allow the graphene oxide and the cross-linker to begin covalently bonding to facilitate the generation of a final crosslinked layer. In some embodiments, the filtering method comprises immersing the substrate in the coating mixture. In some embodiments, the method further comprises drawing the coating mixture into the substrate by applying a negative pressure gradient across the substrate. It is believed that by forcing the liquid of the coating mixture to move through the substrate, some portion of coating mixture can be disposed on the substrate's surface resulting in the thickness of a layer being proportional to the duration of mixture movement through the substrate. In some embodiments, the negative pressure gradient can be applied through a vacuum on one side of the substrate. In some embodiments, the duration of the drawing of the mixture can be varied such that a desired total thickness of the resulting coating layer is achieved, e.g., about 10-100 nm, about 10-50 nm, about 10 nm, 12 nm, about 20 nm, about 30 nm, about 40 nm, about 50 nm, or about 100 nm.

In some embodiments, the filtering method further comprises rinsing the resulting substrate with deionized (DI) water to remove excess material after application of the coating mixture to yield a coated substrate.

3. Mixture Coating Method:

In some embodiments, a mixture coating method is used to apply a graphene oxide aqueous solution and a cross-linker aqueous solution to a substrate, wherein the method comprises creating a mixed coating solution, resting the coating solution to form a coating mixture, and then applying the coating mixture to form a plurality of layers on the substrate. In some embodiments, the number of layers can range from 1 to about 100, where a single mixed layer in considered a single layer.

In some embodiments, creating a mixed coating solution comprises creating a single mixed coating solution by mixing aqueous solutions of a graphene oxide and a cross-linker. In some embodiments, creating a mixed coating solution comprises mixing the graphene oxide solution with concentration of about 0.0001-0.01 wt % and the cross-linker aqueous solution with concentration of about 0.0001-0.01 wt % to yield a coating solution.

In some embodiments, the mixture coating method comprises resting the coating solution at about room temperature for about 30 minutes to about 12 hours, about 1-6 hours, about 5 hours, or about 3 hours. It is believed that resting the coating solution allows the graphene oxide and the cross-linker to begin covalently bonding to facilitate the generation of a final crosslinked layer.

In some embodiments, the mixture coating method further comprises applying the coating mixture to the substrate. In some embodiments, applying a coating mixture to the substrate can be accomplished by blade coating, spray coating, dip coating, spin coating, or other methods known in the art. In some embodiments, applying a coating mixture can be achieved by spray coating the substrate.

In some embodiments, the mixture coating method optionally comprises rinsing the resulting substrate with DI water after application of the coating mixture to remove excess materials, which yields a coated substrate.

EMBODIMENTS

The following embodiments are specifically contemplated:

Embodiment 1

A membrane comprising:
a porous substrate; and
a graphene oxide layer comprising an optionally substituted cross-linked graphene oxide in fluid communication with the porous substrate;
wherein the optionally substituted cross-linked graphene oxide comprises an optionally substituted graphene oxide and a cross-linkage represented by Formula 1:

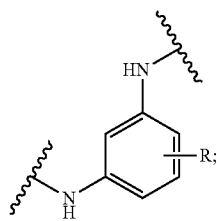

(1)

wherein R is H, $CO_2H$, $CO_2Li$, $CO_2Na$, or $CO_2K$.

Embodiment 2

The membrane of embodiment 1, wherein the cross-linkage is:

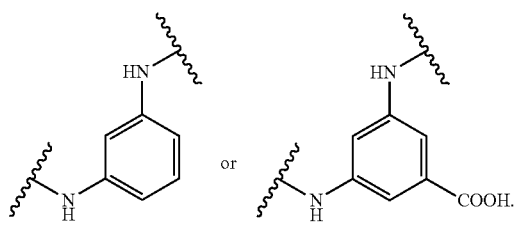 [SMILES: *Nc1cccc(N*)c1 ; *Nc1cc(N*)cc(C(=O)O)c1]

Embodiment 3

The membrane of embodiment 1 or 2, wherein the porous substrate comprises a polymer or hollow fibers.

Embodiment 4

The membrane of embodiment 1, 2, or 3, wherein the optionally substituted graphene oxide comprises platelets.

Embodiment 5

The membrane of embodiment 4, wherein the size of the platelets are about 0.05 μm to about 50 μm.

Embodiment 6

The membrane of embodiment 1, 2, 3, 4, or 5, wherein the optionally substituted cross-linked graphene oxide is about 20 atom % to about 90 atom % carbon.

Embodiment 7

The membrane of embodiment 1, 2, 3, 4, or 5, wherein the optionally substituted cross-linked graphene oxide material is about 1 atom % to about 20 atom % nitrogen.

Embodiment 8

The membrane of embodiment 1, 2, 3, 4, or 5, wherein the optionally substituted cross-linked graphene oxide material is about 3 atom % to about 6 atom % nitrogen.

Embodiment 9

The membrane of embodiment 1, 2, 3, 4, or 5, wherein the optionally substituted cross-linked graphene oxide material is about 5 atom % to about 15 atom % nitrogen.

Embodiment 10

The membrane of embodiment 1, 2, 3, 4, or 5, wherein the optionally substituted cross-linked graphene oxide material is about 9 atom % to about 13 atom % nitrogen.

Embodiment 11

The membrane of embodiment 1, 2, 3, 4, or 5, wherein the optionally substituted cross-linked graphene oxide material is about 10 atom % to about 12 atom % nitrogen.

Embodiment 12

The membrane of embodiment 1, 2, 3, 4, 5, 6, 7, 8, 9, 10, or 11, wherein the optionally substituted cross-linked graphene oxide is prepared by reacting an optionally substituted meta-phenylenediamine (MPD) with an optionally substituted graphene oxide (GO), wherein the weight ratio of optionally substituted meta-phenylenediamine to optionally substituted graphene oxide (MPD/GO) is in a range of about 0.1 to about 100.

Embodiment 13

The membrane of embodiment 12, wherein the weight ratio of optionally substituted meta-phenylenediamine to optionally substituted graphene oxide (MPD/GO) is in a range of 1 to 10.

Embodiment 14

The membrane of embodiment 13, wherein the weight ratio of optionally substituted meta-phenylenediamine to optionally substituted graphene oxide (MPD/GO) is about 1, about 3, or about 7.

Embodiment 15

The membrane of embodiment 13, wherein the weight ratio of optionally substituted meta-phenylenediamine to optionally substituted graphene oxide (MPD/GO) is about 3, or about 7.

Embodiment 16

The membrane of embodiment 13, wherein the weight ratio of optionally substituted meta-phenylenediamine to optionally substituted graphene oxide (MPD/GO) is about 7.

Embodiment 17

The membrane of embodiment 1, 2, 3, 4, 5, 6, 7, 8, 9, 10, 11, 12, 13, 14, 15, or 16, wherein the optionally substituted graphene oxide is a non-functionalized graphene oxide, reduced-graphene oxide, functionalized graphene oxide, functionalized and reduced-graphene oxide, or a combination thereof.

Embodiment 18

The membrane of embodiment 1, 2, 3, 4, 5, 6, 7, 8, 9, 10, 11, 12, 13, 14, 15, or 16, further comprising a salt rejection layer.

Embodiment 19

The membrane of embodiment 18, wherein the salt rejection layer is disposed on the graphene oxide layer.

Embodiment 20

The membrane of embodiment 18 or 19, wherein the salt rejection layer comprises a polyamide prepared by reacting a meta-phenylenediamine with trimesoyl chloride.

Embodiment 21

The membrane of embodiment 1, 2, 3, 4, 5, 6, 7, 8, 9, 10, 11, 12, 13, 14, 15, 16, 17, 18, 19, or 20, wherein the membrane further comprises a protective layer, wherein the protective layer comprises a hydrophilic polymer.

Embodiment 22

The membrane of embodiment 1, 2, 3, 4, 5, 6, 7, 8, 9, 10, 11, 12, 13, 14, 15, 16, 17, 18, 19, 20, or 21, wherein the thickness of the graphene oxide layer is about 5 nm to about 200 nm.

Embodiment 23

The membrane of embodiment 22, the thickness of the graphene oxide layer is about 10 nm to about 100 nm.

Embodiment 24

The membrane of embodiment 1, 2, 3, 4, 5, 6, 7, 8, 9, 10, 11, 12, 13, 14, 15, 16, 17, 18, 19, 20, 21, 22, or 23, comprising 1 to about 100 graphene oxide layers.

Embodiment 25

The membrane of embodiment 19, comprising 1 layer to 10 layers of coating of GO and MPD.

Embodiment 26

A method for dehydrating an unprocessed fluid, comprising exposing the unprocessed fluid to the membrane of embodiment 1, 2, 3, 4, 5, 6, 7, 8, 9, 10, 11, 12, 13, 14, 15, 16, 17, 18, 19, 20, 21, 22, 23, 24, or 25.

Embodiment 27

A method for removing a solute from an unprocessed solution, comprising exposing the unprocessed solution to the membrane of embodiment 1, 2, 3, 4, 5, 6, 7, 8, 9, 10, 11, 12, 13, 14, 15, 16, 17, 18, 19, 20, 21, 22, 23, 24, or 25.

Embodiment 28

The method of embodiment 27, further comprising passing the unprocessed solution through the membrane.

Embodiment 29

The method of embodiment 28, wherein passing the unprocessed solution through the membrane is achieved by applying a pressure gradient across the membrane.

Embodiment 30

A method of making a membrane, comprising:
(a) resting a solution comprising an optionally substituted graphene oxide and a water soluble cross-linker for about 30 minutes to about 12 hours to create a coating mixture;
(b) applying the coating mixture to a substrate;
(c) repeating step (b) as necessary to achieve the desired thickness or number of layers; and
(d) curing the optionally substituted graphene oxide and water soluble cross-linker upon the substrate at about 50° C. to about 120° C. for about 15 minutes to about 2 hours so that the optionally substituted graphene oxide and the water soluble cross-linker are covalently bonded.

Embodiment 31

The method of embodiment 30, wherein the applying the coating mixture to the substrate comprises immersing the substrate into the coating mixture and then drawing the coating mixture into the substrate by applying a negative pressure gradient across the substrate until the desired coating thickness is achieved.

Embodiment 32

The method of embodiment 30, wherein the applying the coating mixture to the substrate comprises blade coating, spray coating, dip coating, or spin coating.

Embodiment 33

The method of embodiment 30, 31, or 32, further comprising rinsing the substrate with deionized water after application of the coating mixture.

Embodiment 34

A method of making a membrane from an optionally substituted meta-phenylenediamine cross-linker and an optionally substituted graphene oxide, comprising:
(a) separately applying to a substrate: 1) an aqueous solution of an optionally substituted graphene oxide, and 2) an aqueous solution of an optionally substituted meta-phenylenediamine cross-linker;
(b) repeating step (a) as necessary to achieve the desired thickness or number of layers; and
(c) curing the optionally substituted graphene oxide and cross-linker upon the substrate at about 50° C. to about 120° C. for about 15 minutes to about 2 hours until the optionally substituted graphene oxide and optionally substituted meta-phenylenediamine cross-linker are covalently bonded.

Embodiment 35

The method of embodiment 34, wherein step (a) is achieved by blade coating, spray coating, dip coating, or spin coating of one or both of the aqueous solutions.

Embodiment 36

The method of embodiment 34 or 35, further comprising rinsing the substrate with deionized water after each application of aqueous solution.

Embodiment 37

The method of embodiment 30, 31, 32, 33, 34, 35 or 36, further comprising applying a salt rejection layer.

Embodiment 38

The method of embodiment 37, wherein the salt rejection layer comprises a polyamide prepared by a method comprising reacting a meta-phenylenediamine with trimesoyl chloride.

EXAMPLES

It has been discovered that embodiments of the selectively permeable membranes described herein have improved permeability resistance to both oxygen gas and vapor with acceptable material properties as compared to other selectively permeable membranes. These benefits are further demonstrated by the following examples, which are intended to be illustrative of the disclosure, but are not intended to limit the scope or underlying principles in any way.

Example 1.1.1: Synthesis of Graphene Oxide Dispersion (GC-1)

GO Preparation:
GO was prepared from graphite using the modified Hummers method. Graphite flakes (2.0 g) (Sigma Aldrich, St. Louis, Mo., USA, 100 mesh) were oxidized in a mixture of 2.0 g of $NaNO_3$ (Aldrich), 10 g $KMnO_4$ of (Aldrich) and 96 mL of concentrated $H_2SO_4$ (Aldrich, 98%) at 50° C. for 15 hours. The resulting paste like mixture was poured into 400 g of ice followed by adding 30 mL of hydrogen peroxide (Aldrich, 30%). The resulting solution was then stirred at room temperature for 2 hours to reduce the manganese dioxide, then filtered through a filter paper and washed with DI water. The solid was collected and then dispersed in DI water with stirring, centrifuged at 6300 rpm for 40 minutes, and the aqueous layer was decanted. The remaining solid was then dispersed in DI water again and the washing process was repeated 4 times. The purified GO was then dispersed in DI water under sonication (power of 20 W) for 2.5 hours to get the GO dispersion (0.4 wt %) as GC-1.

Example 2.1.1: Preparation of a Membrane by Filtration

Substrate Pretreatment:
A supporting membrane, polyamide (Nylon) (0.1 μm pore, Aldrich), was used as a substrate; and it was dip-coated in a dopamine solution (2 g/L dopamine (Aldrich) and 1.3 g/L of Trizma base buffer (Aldrich)) at pH 8.5. The dopamine was polymerized to form polydopamine on the substrate. Then, the polydopamine-coated substrate was dried in oven (DX400, Yamato Scientific Co., Ltd. Tokyo, Japan) at 65° C. This process resulted in a pre-treated substrate.

GO-MPD Application/Filtration Method:
First the GO dispersion, GC-1, was diluted with DI water to create a 0.1 wt % GO aqueous solution. Second, a 0.1 wt % of meta-phenylenediamine (MPD) aqueous solution was prepared by dissolving an appropriate amount of MPD (Aldrich) in DI water. Then, a coating mixture was created by dissolving the aqueous solutions of 0.1 wt % MPD and 0.1 wt % GO in DI water at a weight ratio of 1:1. The resulting solution was then rested for about 3 hours, or normally until the GO and amine have finished reacting. The resulting coating mixture was then filtered through the pretreated substrate under vacuum to draw the solution through the substrate. After solvent was filtered through the substrate, the resulting membrane with the mixture deposited on its surface was then placed in an oven (DX400, Yamato Scientific) at 80° C. for 30 minutes to facilitate further crosslinking. This process generated a membrane without a salt rejection layer (MD-1.1.1.1.1).

Example 2.1.1.1: Preparation of Additional Membranes by Filtration

Additional membranes MD-1.1.1.1.2 through MD-1.1.2.1.4 were constructed using the methods similar to Example 2.1.1, with the exception that parameters were varied for the specific membranes as shown in Table 1. Specifically, the substrate [e.g., polysulfone (PSF), polyether sulfone (PES), polyamide (Nylon), polyimide (PI), or polyvinylidene fluoride (PVDF)], layer thickness, cross-linker [e.g., MPD or 3, 5-diaminobenzoic acid (MPD w/COOH) (Aldrich)], and mass ratio of cross-linker to GO were varied.

TABLE 1

| Membranes Made without a Salt Rejection Layer. | | | | | |
|---|---|---|---|---|---|
| Membrane | Method | Crosslinker | Mass ratio of Crosslinker to GO | Substrate Material | Coating Thickness (nm or lyr) |
| MD-1.1.1.1.1 | Filtration | MPD | 1:1 | Nylon 0.1 μm Pore | 12 |
| MD-1.1.1.1.2 | Filtration | MPD | 1:1 | PVDF | 12 |
| MD-1.1.1.1.3 | Filtration | MPD | 1:1 | PES | 36 |
| MD-1.1.1.1.4 | Filtration | MPD | 1:1 | PI | 36 |
| MD-1.1.1.1.5 | Filtration | MPD | 1:1 | Nylon 0.1 μm Pore | 20 |

TABLE 1-continued

Membranes Made without a Salt Rejection Layer.

| Membrane | Method | Crosslinker | Mass ratio of Crosslinker to GO | Substrate Material | Coating Thickness (nm or lyr) |
|---|---|---|---|---|---|
| MD-1.1.1.1.6 | Filtration | MPD | 3:1 | Nylon 0.1 μm Pore | 20 |
| MD-1.1.1.1.7 | Filtration | MPD | 7:1 | Nylon 0.1 μm Pore | 20 |
| MD 1.1.1.1.8 | Filtration | MPD | 7:1 | Nylon 0.45 μm Pore | 40 |
| MD 1.1.1.1.9 | Filtration | MPD | 7:1 | Nylon 0.45 μm Pore | 100 |
| MD-1.1.1.1.10 | Filtration | MPD | 7:1 | Stretched PP | 16 |
| MD-1.1.1.1.11 | Filtration | MPD | 7:1 | Stretched PP | 26 |
| MD-1.1.1.1.12 | Filtration | MPD | 7:1 | Stretched PP | 40 |
| MD-1.1.1.1.13 | Filtration | MPD | 7:1 | Stretched PP | 60 |
| MD-1.1.1.1.14 | Filtration | MPD | 7:1 | Stretched PP | 80 |
| MD-1.1.2.1.1 | Filtration | MPD w/ COOH | 3:1 | Nylon 0.1 μm Pore | 20 |
| MD-1.1.2.1.2 | Filtration | MPD w/ COOH | 7:1 | Nylon 0.1 μm Pore | 20 |
| MD-1.1.2.1.3 | Filtration | MPD w/ COOH | 7:1 | Stretched PP | 40 |
| MD-1.1.2.1.4 | Filtration | MPD w/ COOH | 7:1 | Stretched PP | 80 |
| MD-1.2.1.1.1 (Prop.) | Mixture | MPD | 1:1 | Nylon 0.1 μm Pore | 20 |
| MD-1.3.1.1.1 | Layer by Layer | MPD | 1:1 | PSF | 1 layer |
| MD-1.3.1.1.2 | Layer by Layer | MPD | 1:1 | PSF | 5 layers |
| MD-1.3.1.1.3 | Layer by Layer | MPD | 1:1 | PSF | 10 layers |

Notes:
[1] Numbering Scheme is MD-J.K.L.M.N, wherein
J = 1-no salt rejection layer; 2-salt rejection layer
K = 1-by filtration method; 2-by mixture-coating method, 3-by layer by layer method
L = 1-MPD; 2-MPD w/COOH;
M = 1-no protective coating; 2-with protective coating
N = membrane # within category
[2] All PP and PVA/PP substrates are approximately 30 μm thick; whereas the nylon substrate varies from 65 to 125 μm thick.
[3] (Prop.)-Indicates a proposed example.

Example 2.1.2: Preparation of a Membrane by Mixture Coating (Proposed)

The GO preparation and substrate preparation can use the same method as that in Example 2.1.1 with the exception of the GO-MPD preparation method, which varies as described below.

GO-MPD Application/Mixture Coating Method (Dip Coating):

First, the GO dispersion, GC-1, can be diluted with DI water to create a 0.1 wt % GO aqueous solution. Second, a 0.1 wt % MPD aqueous solution can be prepared by dissolving an appropriate amount of MPD (Aldrich) in DI water. Then, a coating solution can be created by dissolving the aqueous solutions of 0.1 wt % GO and 0.1% MPD in DI water at a weight ratio of 1:1. The resulting coating solution can be rested for about 3 hours, or normally until the GO and the amine have beenpre-reacted. This process can result in a coating mixture.

The polydopamine-coated substrate can be then coated with the above described coating mixture by dipping the substrate in the coating mixture. Next, the substrate can be rinsed thoroughly in DI water to remove any excess particles. The aforementioned process can be repeated, that is dipping the substrate into the coating mixture and then rinsing with DI water for a number of cycles to get the desired number of layers or thickness of GO and MPD. The resulting membrane can be then kept in an oven (DX400, Yamato Scientific) at 80° C. for 30 minutes to facilitate further crosslinking. This process can result in a membrane without a salt rejection layer.

Example 2.1.3: Preparation of a Membrane Via Layer-by-Layer Application (MD-1.3.1.1.1)

The GO preparation and substrate preparation used the same method as that in Example 2.1.1 with the exception that the GO-MPD application method varied as described below and polysulfone (PSF) was used as a substrate.

GO-MPD Application/Layer-by-Layer Method:

A 0.1 wt % MPD aqueous solution was prepared by dissolving an appropriate amount of MPD (Aldrich) in DI water. A 0.1 wt % GO aqueous solution was made by diluting the GO dispersion, GC-1 in DI water. The polydopamine-coated substrate was then soaked in 0.1 wt % MPD aqueous solution for 5 minutes, rinsed thoroughly with DI water, and subsequently soaked in 0.1 wt % GO solution for 5 minutes to attach the first layer of GO. Next, the membrane was rinsed with DI water to remove excess GO. This process can be repeated, alternately dipping the substrate into MPD and GO solution, for a number of cycles to get the desired number of layers of GO and MPD. In this particular example, the membrane with one layer was prepared. The resulting membrane was then kept in an oven (DX400, Yamato Scientific) at 80° C. for 30 minutes to facilitate further crosslinking. This process resulted in a membrane without a salt rejection layer (MD-1.3.1.1.1).

Example 2.1.3.1: Preparation of Additional Membranes Via Layer-by-Layer Application The sensitivity of the number of layers was examined. For membranes MD-1.3.1.1.2 and MD-1.3.1.1.3, the method used was the same as that in Example 2.1.3, with the exception that the number of layers was varied as shown in 2 or specifically from 1 layer up to 10 layers respectively.

Example 2.2.1: Addition of a Salt Rejection Layer to a Membrane

To enhance the salt rejection capability of the membrane, MD-1.1.1.1.1 was additionally coated with a polyamide salt rejection layer. A 3.0 wt % MPD aqueous solution was prepared by diluting an appropriate amount of MPD (Aldrich) in DI water. A 0.14 vol % trimesoyl chloride solution was made by diluting an appropriate amount of trimesoyl chloride (Aldrich) in isoparrifin solvent (Isopar E & G, Exxon Mobil Chemical, Houston Tex., USA). The GO-MPD coated membrane was then dipped in the aqueous solution of 3.0 wt % of MPD (Aldrich) for a period of 10 seconds to 10 minutes depending on the substrate and then removed. Excess solution remaining on the membrane was then removed by air dry. Then, the membrane was dipped into the 0.14 vol % trimesoyl chloride solution for 10 seconds and removed. The resulting assembly was then dried in an oven (DX400, Yamato Scientific) at 120° C. for 3 minutes. This process resulted in a membrane with a salt rejection layer (MD-2.1.1.1.1).

Example 2.2.1.1: Addition of a Salt Rejection Layer to Additional Membranes

Additional membranes, MD-1.1.1.1.2 through MD-1.1.1.1.7, MD-1.1.2.1.1, MD-1.1.2.1.2 and MD-2.3.1.1.3, were coated with a salt rejection layer using a similar procedure as that in Example 2.2.1. The resulting configurations of the new membranes created are presented in Table 2.

TABLE 2

Membranes with a Salt Rejection Layer.

| Membrane | Method | Cross-linker | Mass ratio of Crosslinker to GO | Substrate Material | Coating Thickness (nm or layer) |
|---|---|---|---|---|---|
| MD 2.1.1.1.1 | Filtration | MPD | 1:1 | Nylon 0.1 µm Pore | 12 |
| MD-2.1.1.1.2 | Filtration | MPD | 1:1 | PVDF | 12 |
| MD-2.1.1.1.3 | Filtration | MPD | 1:1 | PES | 36 |
| MD-2.1.1.1.4 | Filtration | MPD | 1:1 | PI | 36 |
| MD-2.1.1.1.5 | Filtration | MPD | 1:1 | Nylon 0.1 µm Pore | 20 |
| MD-2.1.1.1.6 | Filtration | MPD | 3:1 | Nylon 0.1 µm Pore | 20 |
| MD-2.1.1.1.7 | Filtration | MPD | 7:1 | Nylon 0.1 µm Pore | 20 |
| MD 2.1.2.1.1 | Filtration | MPD w/ COOH | 3:1 | Nylon 0.1 µm Pore | 20 |
| MD 2.1.2.1.2 | Filtration | MPD w/ COOH | 7:1 | Nylon 0.1 µm Pore | 20 |
| MD-2.3.1.1.3 | Layer by Layer | MPD | 1:1 | PSF | 10 layers |

Notes:

[1] Numbering Scheme is MD-J.K.L.M.N, wherein

J = 1-no salt rejection layer; 2-salt rejection layer

K = 1-filtration method; 2-mixture-coating method, 3-layer by layer method

L = 1-MPD; 2-MPD w/COOH;

M = 1-no protective coating; 2- protective coating

N = membrane # within category

[2] All PP and PVA/PP substrates are approximately 30 µm thick; whereas the nylon substrate varies from 65 to 125 µm in thickness.

[3] (Prop.)-Represents a proposed example.

Example 2.2.2: Preparation of a Membrane with a Protective Coating

Figure 9A:
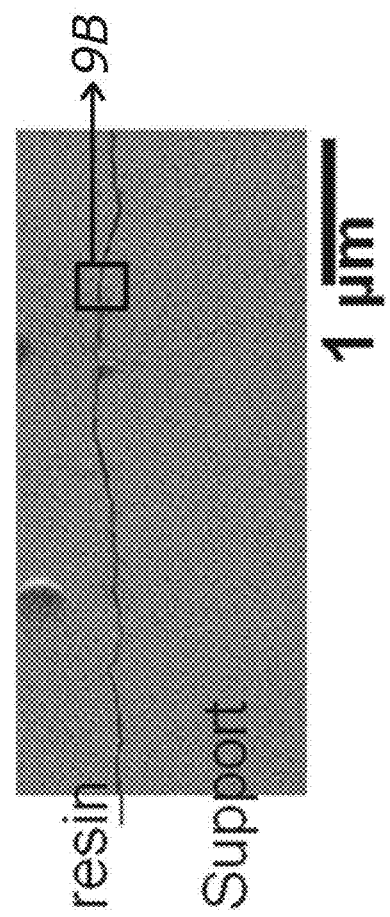
FIGS. 9A-9B shows SEM data of a membrane showing a substrate, the GO-MPD layer, and a protective coating (resin).
Figure 9B:
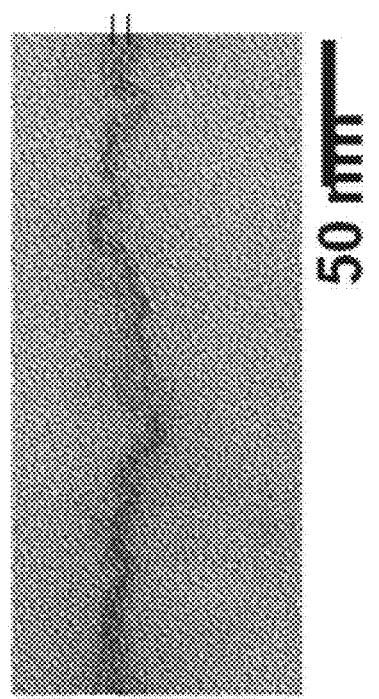

A sample of MD-1.3.1.1.3, a 10-layer membrane prepared via the layer-by-layer coating of GO and MPD on a substrate of PSF, was coated with a protective resin to yield MD-1.3.1.2.3, as shown in FIG. 9. This coating was made by known methods in the art.

Other selected membranes can be coated with protective layers. First, a PVA solution of 2.0 wt % can be prepared by stirring 20 g of PVA (Aldrich) in 1 L of DI water at 90° C. for 20 minutes until all granules dissolve. The solution was then cooled to room temperature. The selected substrates can be immersed in the solution for 10 minutes and then removed. Excess solution remaining on the membrane can then be removed by paper wipes. The resulting assembly can then be dried in an oven (DX400, Yamato Scientific) at 90° C. for 30 minutes. A membrane with a protective coating can thus be obtained.

Comparative Example 2.1.1: Preparation of Comparative Membranes

Comparative membranes (CMDs), CMD-1.1 through CMD-1.2 were created using commercially available substrate components of polysulfone membrane (PSF) (Sterlitech Corporation, Kent, Wash., USA) and polypropolyene (PP) filtration membrane (Celgard LLC, Charlotte, N.C., USA). CMD-1.3, a PVA/PP membrane, was created by immersing a PP filtration membrane in a PVA/water solution (Aldrich) for 10 minutes and then drying the resulting membrane in an oven (DX400, Yamato Scientific) at 90° C. for about 30 minutes.

Comparative Example 2.1.2: Preparation of Additional Comparative Membranes

Comparative membranes CMD-2.1.1 through CMD-2.2.2 were made using methods similar to those used in Example 2.1.1 with the variations outlined in Table 3.

TABLE 3

Comparative Membranes.

| Membrane | Method | Cross-linker | Mass Ratio of Cross-linker to GO | Substrate Material | Coating Thickness (nm) |
|---|---|---|---|---|---|
| CMD-1.1 | n/a | — | — | PSF | — |
| CMD-1.2 | n/a | — | — | Stretched PP | — |
| CMD-1.3 | n/a | — | — | Stretched PP/PVA | n/a |
| CMD-2.1.1 | Filtration | EDA | 1:1 | Nylon 0.1 μm Pore | 20 |
| CMD-2.1.2 | Filtration | EDA | 3:1 | Nylon 0.1 μm Pore | 20 |
| CMD-2.1.3 | Filtration | EDA | 7:1 | Nylon 0.1 μm Pore | 20 |
| CMD-2.2.1 | Filtration | PPD | 3:1 | Nylon 0.1 μm Pore | 20 |
| CMD-2.2.2 | Filtration | PPD | 7:1 | Nylon 0.1 μm Pore | 20 |

Notes:
[1] All PP and PVA/PP substrates are approximately 30 μm thick; whereas the nylon substrate varies from 65 to 125 μm in thickness.

Example 3.1: Membrane Characterization

TEM Analysis:

Membrane MD-1.1.1.1.1 was analyzed with a Transmission Electron Microscope (TEM). The TEM procedures are similar to those known in the art. The TEM cross-section analysis of GO-MPD membrane is shown in FIG. 9. The membrane thickness is about 5-10 nm, and is continuous along the substrate.

XPS Analysis:

Membrane MD-1.1.1.1.1 was analyzed by X-ray photoelectron spectroscopy (XPS) to determine the relative distribution of the atomic spectra. The procedures for XPS are similar to those known in the art. The XPS analysis, shown in Table 4, indicates a significant increase of nitrogen in the GO-MPD membrane, due to the cross-linking of MPD with GO, and partial reduction of oxygen as the epoxide was significantly reduced.

TABLE 4

XPS Analysis Result of GO and GO-MPD Membranes.

| Samples | C | N | O | S | Cl |
|---|---|---|---|---|---|
| Ref (GO) | 65.2 | — | 34.0 | 0.8 | — |
| GO-MPD | 67.5 | 10.9 | 20.8 | 0.5 | 0.3 |
| GO-MPD w/COOH | 62.6 | 4.4 | 32.5 | 0.5 | — |

XRD Analysis:

The basic GO-MPD membrane structure in a representative MD-1.1.1.1.1 membrane was characterized by X-ray Diffraction (XRD) as shown in FIG. 10. The structure was the same as MD-1.1.1.1.1 except that the substrate was a nylon substrate to facilitate testing. The d-spacing of the lattice was calculated by Bragg equation: $2d \sin \theta = m\lambda$, which shows that the GO-MPD has a longer interlayer distance than unmodified GO, see Table 5. The increase in interlayer distance is likely due to the effect of the MPD cross-linking.

TABLE 5

Interlayer Distance of GO-MPD Membrane.

| | 2θ (deg) | D-spacing (nm) |
|---|---|---|
| GO | 9.5 | 0.93 |
| GO-MPD | 6.16 | 1.43 |

Figure 11:
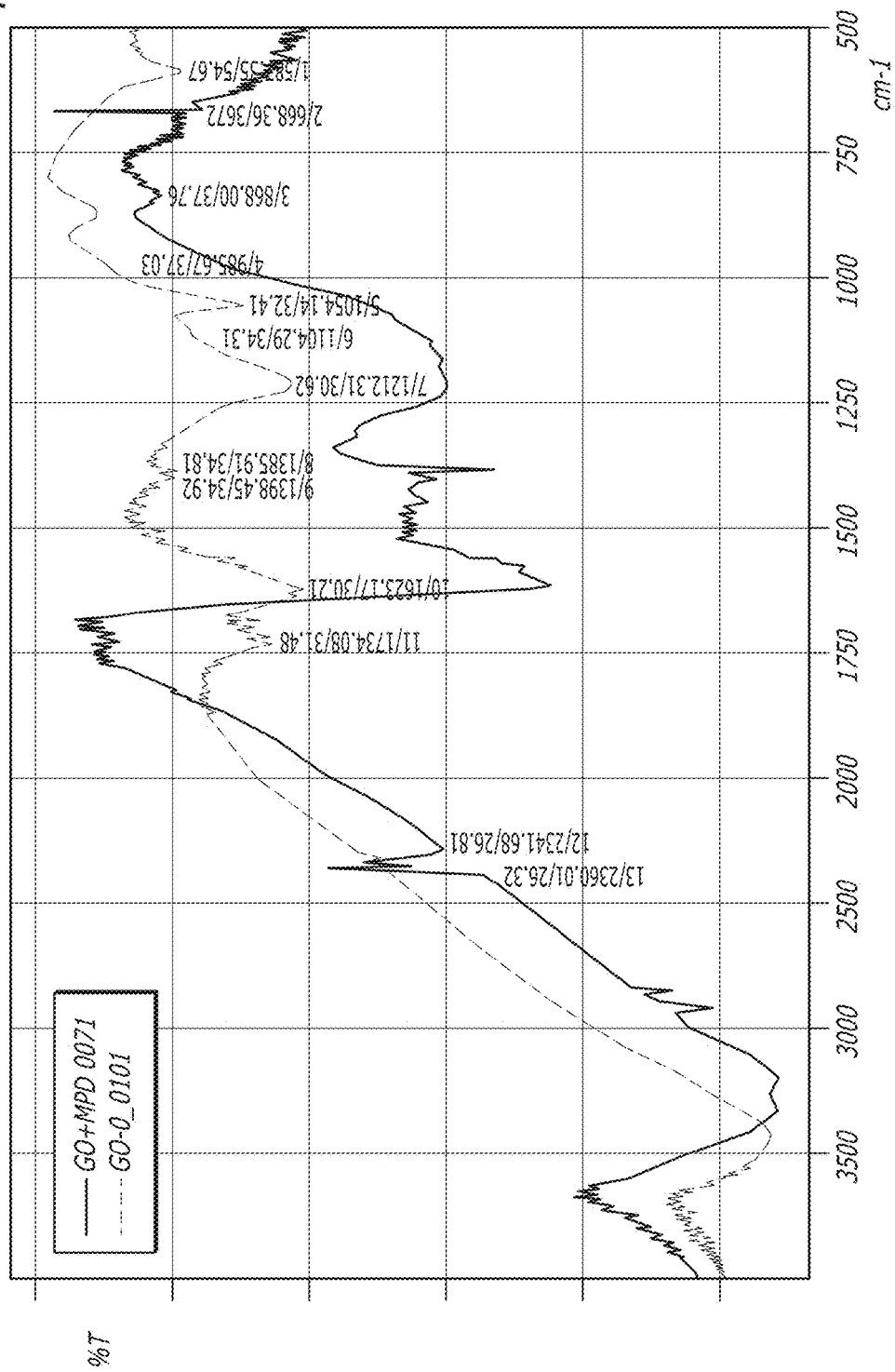
FIG. 11 is a plot showing the infrared (IR) spectra comparison of GO and GO-MPD.

IR Analysis:

An infrared (IR) analysis of GO-MPD structure in the MD-1.1.1.1.1 membrane was performed using methods known in the art. The IR analysis, as shown in FIG. 11 for both GO and GO-MPD indicating the formation of C—N and N—H bonds. The existence of the C—N and N—H bonds suggests that cross-linking has occurred.

Example 4.1: Dehydration/Water Separation Performance Testing of Selected Membranes Dehydration Characteristics—Water Vapor Permeability Testing:

The water vapor permeability of the membranes was tested. For the gas leakage, Nitrogen was chosen to mimic air.

Figure 12:
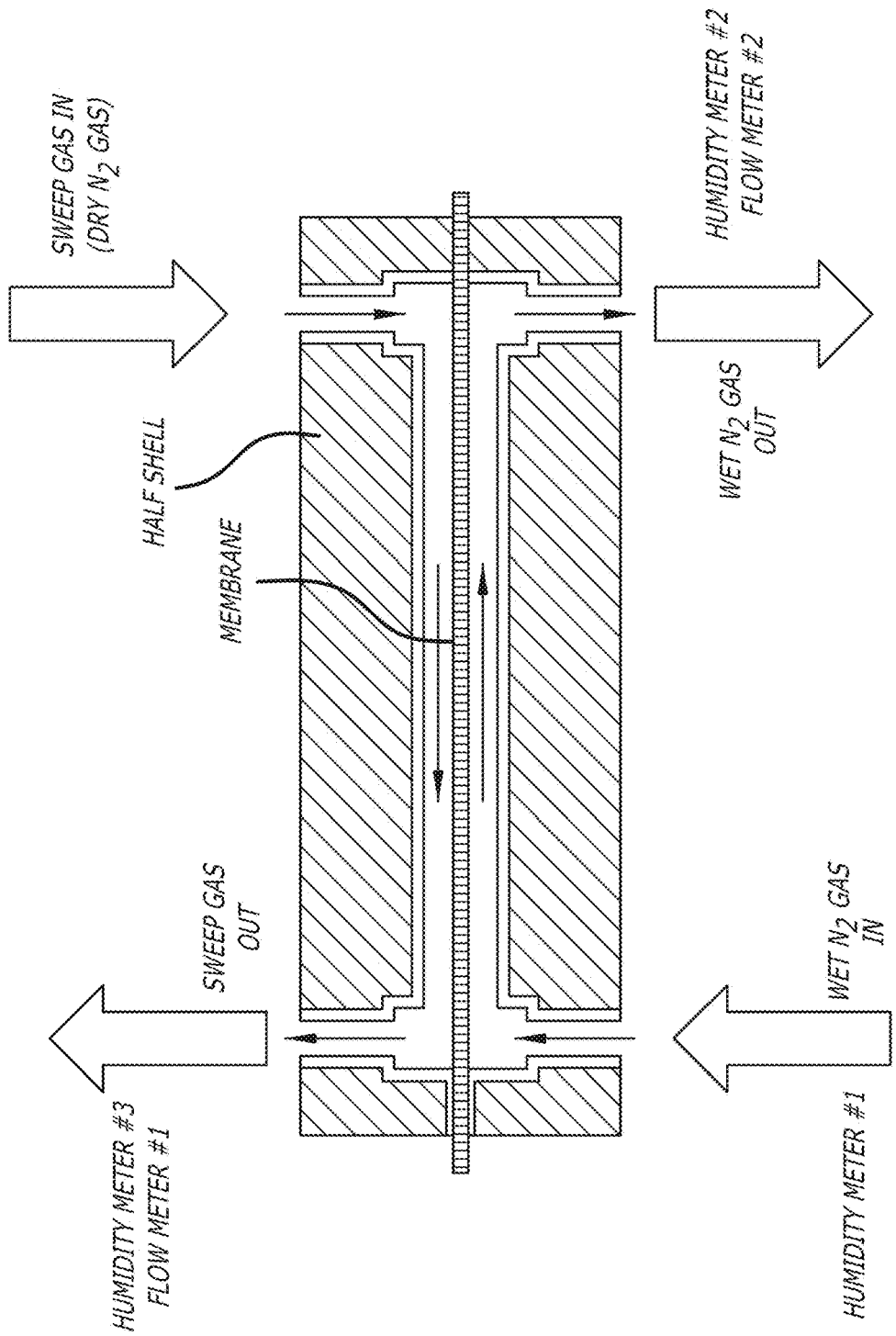
FIG. 12 is a diagram depicting the experimental setup for the water vapor permeability and gas leakage testing.

A sample diagram of the setup is shown in FIG. 12. The test setup consisted of a cross-flow test cell (CF016A, Sterlitech) which forms two plenums on either side, each with its own inlet and an outlet. The membrane being measured was placed in the 45 mm×45 mm testing chamber and sandwiched between the two halves of the test cell to create two sealed plenums when the shells are mated, each plenum in fluid communication only through the membrane. Then the inlets and outlets were chosen such that the fluid flow in each plenum was in a counter-flow configuration. The wet $N_2$ gas was sent into the setup from the wet side, the first side, and then exited with some residual water vapor and gas permeated from the membrane sample into the second side, the dry side. The sweep or dry $N_2$ gas was sent into the setup and then vented, with the wet gas being entrained from the membrane. Humidity and Temperature were measured at three positions: input and output on the wet $N_2$ gas side, and output on the dry $N_2$ gas side using a Humidity/Temperature Transmitters (RHXL3SD, Omega Engineering, Inc., Stamford, Conn., USA). In addition, the flow rate was also measured for both wet and dry sides by two Air Flow Sensors (FLR1204-D, Omega). The gas pressure was also measured on both the wet and dry side by two Digital Pressure Gauges (Media Gauge MGA-30-A-9V-R, SSI Technologies, Inc., Janesville, Wis., USA).

For the measurements, selected membranes were placed in the setup and the wet side inlet was set to a relative humidity of between about 80% to about 90%. The dry side inlet had a relative humidity of 0%. The upstream pressure for the wet gas stream was set to 0.13 psig. The upstream pressure for the dry gas stream was set to 0.03 psig. From the instruments, the water vapor pressure and absolute humidity at the three measurement stations were derived/calculated from the measured temperature and humidity data. Then the water vapor transmission rate was derived from the difference in absolute humidity, flow rate, and exposed area of the membrane. Lastly, the water vapor permeability was derived from the water vapor transmission rate and the water vapor pressure difference between the two plenums. The nitrogen flow rate was derived from the dry $N_2$ output and the wet $N_2$ inputs as well as the water vapor transmission rate.

Dehydration Characteristics—Nitrogen Leakage Testing:

The gas leakage of the membranes was tested. Nitrogen was chosen to mimic air. For these tests, the same test setup was used as that in the Water Vapor Permeability testing with the exception that the dry $N_2$ air inlet was closed and the dry $N_2$ outlet was, instead of being vented to atmosphere, vented to a flow measurement instrument (D800286 Gilibrator—2 Standard Air Flow Calibrator; Sensidyne, St. Petersburg, Fla., USA) with a normal test cell (20 cc to 6 LPM, Sensidyne) or a low-flow test cell (1 cc/min to 250 cc/min, Sensidyne) to measure the flow leakage through the membrane. For $N_2$ flow rates at about 1 cc/min or below, a 0.5 mL manual bubble flow meter was used (#23771, Aldrich), which has a range of about 0.03 cc/min to about 5 cc/min, to determine the leakage rate instead of using the flow measurement instrument described above.

For the measurements, the selected membranes were placed in the setup and the wet side inlet was set to a relative humidity of between about 80% to about 90%. The dry side inlet was closed to seal off the portion upstream of the flow measurement instrument so that only gas leaked through the membrane would go to the flow measurement instrument. The upstream pressure for the wet gas stream was set to 0.13 psig and the leakage of the $N_2$ through the membrane was measured.

TABLE 6

Water Vapor Permeability Measurements for Various Membranes.

| Membrane | Coating Thickness (nm) | $H_2O$ vapor permeability ($\mu g/m^2 \cdot s \cdot Pa$) | $N_2$ Gas Flow Rate (cc/min) |
|---|---|---|---|
| GO-MPD 1:7 on Nylon 0.1 μm Pore (MD-1.1.1.1.7) | 20 nm | 46.7 | — |
| GO-MPD 1:7 on Nylon 0.45 μm Pore (MD-1.1.1.1.8) | 40 nm | 49.4 | 27.25 |
| GO-MPD 1:7 on Nylon 0.45 μm Pore (MD-1.1.1.1.9) | 100 nm | 51.2 | 5.45 |
| GO-MPD w/COOH 1:7 on Nylon 0.1 μm Pore (MD-1.1.2.1.2) | 20 nm | 44.5 | — |

As shown in Table 6, water permeability can be maintained by using larger substrate pores. Additionally, for the larger substrates, the effect of defects due to the large pore sizes can be minimized by increasing the GO-MPD layer thickness resulting in high water vapor permeability with the exclusion of other gases.

TABLE 7

Vapor Permeability Measurements for Various Membranes (without Salt Rejection Layer).

| Membrane | Coating Thickness (nm) | $H_2O$ vapor permeability ($\mu g/m^2 \cdot s \cdot Pa$) | $N_2$ Gas Flow Rate (cc/min) |
|---|---|---|---|
| Stretched PP Substrate (CMD-1.2) | — | 55.1 | 75.29 |
| Stretched PP/PVA Substrate (CMD-1.3) | — | 51.8 | 90.00 |
| 1:7 GO-MPD on Stretched PP (MD-1.1.1.1.10) | 16 nm | 44.9 | 2.67 |
| 1:7 GO-MPD on Stretched PP (MD-1.1.1.1.11) | 26 nm | 51.2 | 0.10 |
| 1:7 GO-MPD on Stretched PP (MD-1.1.1.1.12) | 40 nm | 38.9 | 0.19 |
| 1:7 GO-MPD on Stretched PP (MD-1.1.1.1.13) | 60 nm | 41.4 | 0.28 |
| 1:7 GO-MPD on Stretched PP (MD-1.1.1.1.14) | 80 nm | 36.9 | 0.24 |
| 1:7 GO-MPD w/COOH on Stretched PP (MD-1.1.2.1.3) | 40 nm | 32.3 | 0.24 |
| 1:7 GO-MPD w/COOH on Stretched PP (MD-1.1.2.1.4) | 80 nm | 28.4 | 0.14 |

As shown in Table 7, the GO-MPD coated PP substrates exhibited a distinct drop in permeability of other gases such as $N_2$ besides water when the thickness was above 16 nm. Additionally, the water vapor permeability remains at least 50% of that of the uncoated substrates (CMD-1.2 or CMD-1.3 membrane) demonstrating the ability of the membrane to reject other gases while maintaining water vapor flux across the membrane.

Example 4.2: Reverse Osmosis Performance Testing of Selected Membranes

Water Flux and Salt Rejection Testing:

The water flux of GO-MPD membrane coated on varies porous substrates were found to be very high, which is comparable with porous polysulfone substrate widely used in current reverse osmosis membranes.

For the membranes made via layer-by-layer method, the sensitivity of water flux relates to the numbers of layers in the membranes was investigated, and the results are shown in Table 8. As shown in the Table 8, there is no appreciable variation on water flux as the result of the increase in the number of GO-MPD layers.

TABLE 8

Water Flux and Salt Rejection of GO-MPD Membranes Prepared by Layer-By-Layer (LBL) Method

| | DI water flux @50 psi (GFD) | DI water flux @100 psi (GFD) | DI water flux @200 psi (GFD) | 1500 ppm NaCl Flux @225 psi (GFD) | NaCl Rejection. (%) |
|---|---|---|---|---|---|
| PSF(dopamine coated) (CMD-1.1) | 289 | — | — | — | — |
| GO-MPD on PSF(dopamine coated) 1 layer (MD-1.3.1.1.1) | 136 | 267 | 457 | 307 | 16 |
| GO-MPD on PSF(dopamine coated) 5 layers (MD-1.3.1.1.2) | 39 | 152 | 258 | 323 | 12 |
| GO-MPD on PSF(dopamine coated) 10 layers (MD-1.3.1.1.3) | 122 | 213 | 335 | 223 | 16 |

For the filter method, the various membranes created were examined to see the variations on water flux under the same head pressure. The results are presented in Table 9 which shows that for the membrane (ME-1.1.1.1.2), even with coating of GO-MPD substrate, the water flux can exceed an uncoated PSF membrane (CMD-1.1).

TABLE 9

Water Flux Data of GO-MPD Membranes Prepared by Filtration Method Versus Thickness and Substrate Differences.

|  | PSF (no coating) (CMD-1.1) | GO-MPD on Nylon substrate (MD-1.1.1.1.1) | GO-MPD on PVDF substrate (ME-1.1.1.1.2) | GO-MPD on PES substrate (ME-1.1.1.1.3) | GO-MPD on PI substrate (ME-1.1.1.1.4) |
|---|---|---|---|---|---|
| Coating Thickness | n/a | 12 nm | 12 nm | 36 nm | 36 nm |
| Water flux @ 30 psi (GFD) | 243 | 208 | 854 | 199 | 64 |

To test the salt rejection capability, the reverse osmosis membrane comprising a 10-layer GO-MPD coated substrate (MD-2.3.1.1.3) was first tested to determine the membrane's ability to reject salt and retain adequate water flux. As seen in Table 10, the membrane has demonstrated high NaCl salt rejection and good water flux. In addition, the salt rejection capability of membranes with various cross-linkers were also tested to determine the effect of different cross-linker materials and compared to the comparative examples to determine the relative effect of the new cross-linker materials.

TABLE 10

Performance of Selected Polyamide Coated Membranes.

| Membrane | 1500 ppm NaCl Rejection (%) | Water Flux (GFD) |
|---|---|---|
| PA + 10-layer 1:1 GO-MPD (MD-2.3.1.1.3) | 95.99 | 16.8 |
| PA + 20 nm Filtered 1:1 GO-MPD Unsub. (MD-2.1.1.1.5) | 76 | 4.6 |
| PA + 20 nm Filtered 1:1 GO-EDA (CMD-2.1.1) | 30 | 9.9 |
| PA + 20 nm Filtered 1:3 GO-MPD Unsub. (MD-2.1.1.1.6) | 91 | 3.7 |
| PA + 20 nm Filtered 1:3 GO-MPD w/ COOH (MD-2.1.2.1.1) | 93 | 7.0 |
| PA + 20 nm Filtered 1:3 GO-PPD (CMD-2.2.1) | 59 | 5.7 |
| PA + 20 nm Filtered 1:7 GO-MPD (MD-2.1.1.1.7) | 94 | 2.9 |
| PA + 20 nm Filtered 1:7 GO-MPD w/COOH (MD-2.1.2.1.2) | 95.7 | 6.4 |
| PA + 20 nm Filtered 1:7 GO-EDA (CMD-2.1.3) | 81 | 2.5 |
| PA + 20 nm Filtered 1:7 GO-PPD (CMD-2.2.2) | 35 | 10.7 |

Notes:
[1] PA: polyamide coating (salt rejection layer)
[2] Cell Testing Conditions: pressure: 225 psi, temperature: 25° C., pH: 6.5-7.0, run flow: 1.5 L/min From the data collected, it was shown that the GO with a meta-phenylenediamine (MPD) cross-linker outperformed comparable GO membranes with ethylenediamine (EDA) or para-phenylenediamine (PPD) cross-linkers in terms of salt rejection with comparable water flux rates. In addition, the GO-MPD w/ COOH membrane (MD-2.1.2.1.1) showed higher salt rejection and a high water flux than the GO-MPD without substitutions (MD-2.1.1.1.6).

Unless otherwise indicated, all numbers expressing quantities of ingredients, properties such as molecular weight, reaction conditions, and etc. used in herein are to be understood as being modified in all instances by the term "about."

Each numerical parameter should at least be construed in light of the number of reported significant digits and by applying ordinary rounding techniques. Accordingly, unless indicated to the contrary, the numerical parameters may be modified according to the desired properties sought to be achieved, and should, therefore, be considered as part of the disclosure. At the very least, the examples shown herein are for illustration only, not as an attempt to limit the scope of the disclosure.

The terms "a," "an," "the" and similar referents used in the context of describing embodiments of the present disclosure (especially in the context of the following claims) are to be construed to cover both the singular and the plural, unless otherwise indicated herein or clearly contradicted by context. All methods described herein may be performed in any suitable order unless otherwise indicated herein or otherwise clearly contradicted by context. The use of any and all examples, or exemplary language (e.g., "such as") provided herein is intended merely to better illustrate embodiments of the present disclosure and does not pose a limitation on the scope of any claim. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Certain embodiments are described herein, including the best mode known to the inventors for carrying out the embodiments. Of course, variations on these described embodiments will become apparent to those of ordinary skill in the art upon reading the foregoing description. The inventor expects skilled artisans to employ such variations as appropriate, and the inventors intend for the embodiments of the present disclosure to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A membrane comprising:
a porous substrate; and
a graphene oxide layer comprising a cross-linked graphene oxide in fluid communication with the porous substrate;
wherein the cross-linked graphene oxide comprises a graphene oxide covalently bound to a cross-linkage, wherein the cross-linkage is represented by Formula 1:

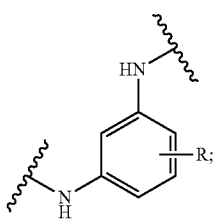
(Formula 1)

wherein the nitrogen atoms of the cross-linkage are directly bonded to a carbon atom of graphene oxide;
wherein the cross-linked graphene oxide is prepared by reacting a mixture comprising a graphene oxide and a cross-linker, wherein the cross-linker is represented by Formula 2:

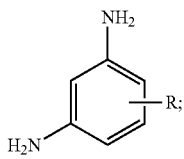
(Formula 2)

wherein, in Formula 1 and Formula 2, R is H, $CO_2H$, $CO_2Li$, $CO_2Na$, or $CO_2K$;
wherein the weight ratio of the cross-linker to the graphene oxide is in a range of 1 to 10.

2. The membrane of claim 1, wherein the cross-linkage is:

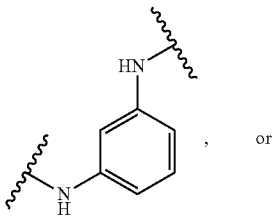, or

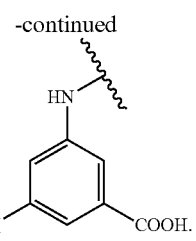

3. The membrane of claim 1, wherein the porous substrate comprises a polymer or hollow fibers.

4. The membrane of claim 1, wherein the cross-linked bonded graphene oxide comprises platelets that have a size that is about 0.05 μm to about 50 μm.

5. The membrane of claim 1, wherein the cross-linked graphene oxide is about 20 atom % to about 90 atom % carbon.

6. The membrane of claim 1, further comprising a salt rejection layer.

7. The membrane of claim 6, wherein the salt rejection layer is disposed on the graphene oxide layer.

8. The membrane of claim 6, wherein the salt rejection layer comprises a polyamide prepared by reacting meta-phenylenediamine with trimesoyl chloride.

9. The membrane of claim 1, wherein the membrane further comprises a protective layer, wherein the protective layer comprises a hydrophilic polymer.

10. The membrane of claim 1, wherein the thickness of the graphene oxide layer is about 5 nm to about 200 nm.

11. A method for removing a solute from an unprocessed solution, comprising passing the unprocessed solution through the membrane of claim 1, wherein passing the unprocessed solution through the membrane is achieved by applying a pressure gradient across the membrane.

12. A method of making a membrane of claim 1, comprising:

(a) resting a solution comprising the graphene oxide and the cross-linker for about 30 minutes to about 12 hours to create a coating mixture;

(b) applying the coating mixture to the porous substrate;

(c) repeating step (b) as necessary to achieve the desired thickness or number of layers; and (d) curing the graphene oxide and the cross-linker upon the substrate at about 50° C. to about 120° C. for about 15 minutes to about 2 hours so that the graphene oxide and the cross-linker are covalently bonded to form the cross-linkage.

* * * * *